US008294917B2

(12) United States Patent
Shinyama

(10) Patent No.: US 8,294,917 B2
(45) Date of Patent: Oct. 23, 2012

(54) IMAGE FORMING APPARATUS FOR DETERMINING THE AUTHENTICITY OF AN EXCHANGE PART

(75) Inventor: Hideki Shinyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1090 days.

(21) Appl. No.: 11/738,624

(22) Filed: Apr. 23, 2007

(65) Prior Publication Data

US 2007/0279647 A1 Dec. 6, 2007

(30) Foreign Application Priority Data

Apr. 25, 2006 (JP) ................................ 2006-120311

(51) Int. Cl.
G06K 15/00 (2006.01)

(52) U.S. Cl. ............ 358/1.14; 399/24; 399/27; 399/28; 399/29; 399/30; 399/111; 399/119; 399/120

(58) Field of Classification Search ................ 358/1.14; 399/24, 27–30, 111, 119, 120
See application file for complete search history.

(56) References Cited

U.S. PATENT DOCUMENTS 6,174,042 B1 * 1/2001 Kobayashi et al. ............ 347/23
7,382,989 B2 * 6/2008 Takei ............................ 399/12
2005/0031360 A1 * 2/2005 Yamazaki ...................... 399/13
2005/0078165 A1 * 4/2005 Harada et al. ................. 347/137
2005/0128236 A1 * 6/2005 Fukasaka ....................... 347/16
2005/0244169 A1 * 11/2005 Ono ............................... 399/12
2005/0244170 A1 * 11/2005 Ono et al. ...................... 399/12
2006/0034625 A1 * 2/2006 Kajikawa ....................... 399/12
2006/0193646 A1 * 8/2006 Suzuki et al. ................... 399/12
2006/0208899 A1 * 9/2006 Suzuki et al. ............. 340/572.7
2006/0221143 A1 * 10/2006 Kodama ......................... 347/70

FOREIGN PATENT DOCUMENTS

JP 4-195167 A 7/1992
JP 2002-331686 11/2002
JP 2003-195705 A 7/2003
JP 2003-241590 A 8/2003
JP 2003-302879 A 10/2003
JP 2004-013715 A 1/2004
JP 2005-316228 A 11/2005
JP 2006-053231 A 2/2006

* cited by examiner

*Primary Examiner* — Benjamin O Dulaney
(74) *Attorney, Agent, or Firm* — Rabin & Berdo, P.C.

(57) ABSTRACT

An image forming apparatus is supplied capable of lowering cost of exchange part. In the image forming apparatus, the exchange part is furnished being attachable and removable, an identification information obtaining process section to obtain identification information of the exchange part from the exchange part, and an operation allowing process section to allow image formation in the case that the identification information obtaining process section can not obtain the identification information, are comprised, so that it is unnecessary to provide an identification information storing portion for storing the identification information to the exchange part of shipment stage.

28 Claims, 26 Drawing Sheets

IMAGE FORMING APPARATUS FOR DETERMINING THE AUTHENTICITY OF AN EXCHANGE PART

BACKGROUND OF THE INVENTION

1. Field of the Invention

The invention relates to an image forming apparatus.

2. Related Background Art

In an image forming apparatus such as printer, copying apparatus, facsimile apparatus, multiple apparatus and the like, for example, in a printer, an exchange part such as drum cartridge, toner cartridge and the like is furnished as being attachable and removable with respect to a substance body, that is, an apparatus substance. In general, the manufacturer of the apparatus substance imagines a case that an exchange part such as a pure part, a recommended part or the like is attached, and performs a design and a manufacture of the apparatus substance so as to obtain a predetermined image quality and a predetermined performance.

However, when an exchange part such as an imitational part, a similar part or the like is attached with respect to the above stated apparatus substance, the printer executes operations out of imagining range of the manufacturer. For example, various problems such as low image quality, wrong operation, trouble, paper damage (e.g. break, wrinkle), and the like will happen, so that the performance of the printer will drop.

Therefore, a RFID tag is provided in the drum cartridge, and a printer is supplied capable of discriminating whether the attached drum cartridge is pure part and the like or not according to the RFID tag; in the case that the attached drum cartridge is an imitational part, displaying the content expressing such case on a displaying section; and prohibiting to execute print. Such technology may refer to patent document 1.

Patent document 1: Japan patent publication 2002-331686.

However, in the above stated conventional printer, because it is necessary to provide the RFID tag with respect to the drum cartridge in case of shipment, the cost of the drum cartridge become high.

SUMMARY OF THE INVENTION

It is, therefore, an object of the invention to provide an image forming apparatus capable of solving the above problem so as to lower the cost of the exchange part.

According to the present invention, there is provided an image forming apparatus, comprising an identification information obtaining process section to obtain identification information of the exchange part from the exchange part; and an operation allowing process section to allow image formation in the case that the identification information obtaining process section can not obtain the identification information.

Moreover, in the image forming apparatus, the operation allowing process section may allow the image formation for a predetermined period after an initialization process of the image forming apparatus is performed.

Moreover, in the image forming apparatus, the exchange part may have an identification information storing portion to store identification information of the exchange part, and the operation allowing process section may allow image formation in the case that the identification information obtaining process section can obtain the identification information.

Moreover, in the image forming apparatus, the exchange part may be a developer accommodating section to accommodate developer.

Moreover, the developer accommodating section may be an ink tank to accommodate ink.

Moreover, the developer accommodating section also may be an ink cartridge to accommodate ink.

Moreover, the developer accommodating section also may be a toner cartridge to accommodate toner.

Moreover, in the image forming apparatus, the operation allowing process section may have a counting portion to count a predetermined operation after an initialization process of the image forming apparatus is performed; and the operation allowing process section may perform a limitation of the image formation when count value of the counting portion meets a predetermined condition.

Moreover, in the image forming apparatus, the operation allowing process section may drop speed of the image formation when the count value of the counting portion meets the predetermined condition.

Moreover, the image forming apparatus, the counting portion may have a dot counting part to accumulate dot number of image; and the operation allowing process section may perform a limitation of the image formation when count value of the dot counting part meets a predetermined condition, Moreover, the image forming apparatus may further comprise an exchange judging section to judge whether the exchange part is exchanged, wherein the operation allowing process section may perform the limitation of the image formation when the exchange judging section judged that the exchange part is exchanged and an obtainment of the identification information is impossible.

Moreover, in the image forming apparatus, the exchange judging section may store exchange information indicating that an exchange of the exchange part is executed to a storing section when the obtainment of the identification information of the exchange part is possible, and the operation allowing process section may read out the exchange information from the storing section and judge that the exchange part has been exchanged, then may perform the limitation of the image formation if the obtainment of the identification information is impossible.

Moreover, the image forming apparatus may further comprise a remainder amount judging section to judge whether a remainder amount of consumables supplied by the exchange part becomes a predetermined value, wherein the operation allowing process section, when the remainder amount judging section judged that the remainder amount of the exchange part is less than the predetermined value, stores an exchange information indicating that an exchange of the exchange part to a storing section, and the operation allowing process section reads out the exchange information from the storing section, and in a state that a record indicating that the remainder amount is less than the predetermined value is existing, performs a limitation of the image formation if an obtainment of the identification information is impossible.

The effect of the present invention

According to the present invention, in an image forming apparatus, an exchange part is furnished to be attachable and removable. Then, the image forming apparatus comprises an identification information obtaining process section to obtain an identification information of the exchange part from the exchange part; and an operation allowing process portion to allow an image formation when the identification information can not be obtained by the identification information obtaining process section.

Because the image formation is allowed when the identification information can not be obtained by the identification information obtaining process section, it becomes unnecessary to provide an identification information storing portion for storing the identification information in the exchange part of shipment. Therefore, the cost of the exchange part can be lowered.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings. In the embodiments, as an image forming apparatus, a printer is used, and as an image formation, a print is explained.

<Embodiment 1>

Figure 2:
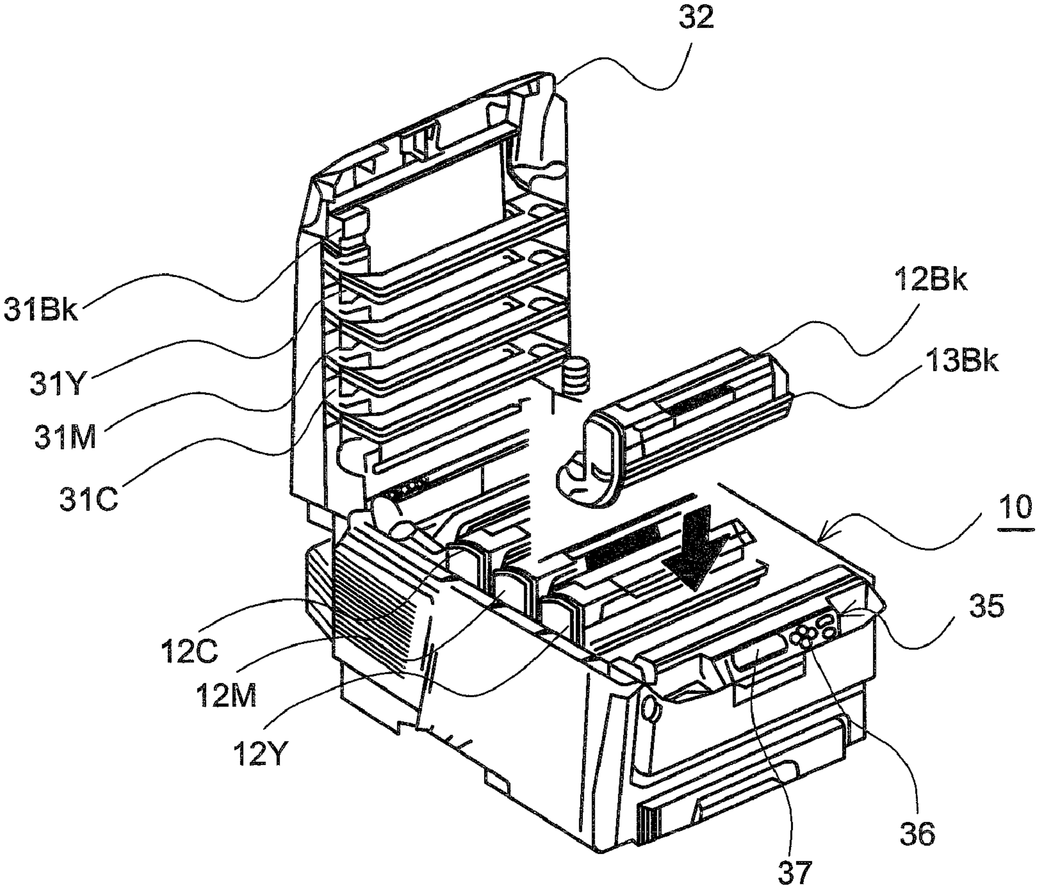
FIG. 2 is a cubic diagram showing a printer in embodiment 1 of the present invention.
Figure 3:
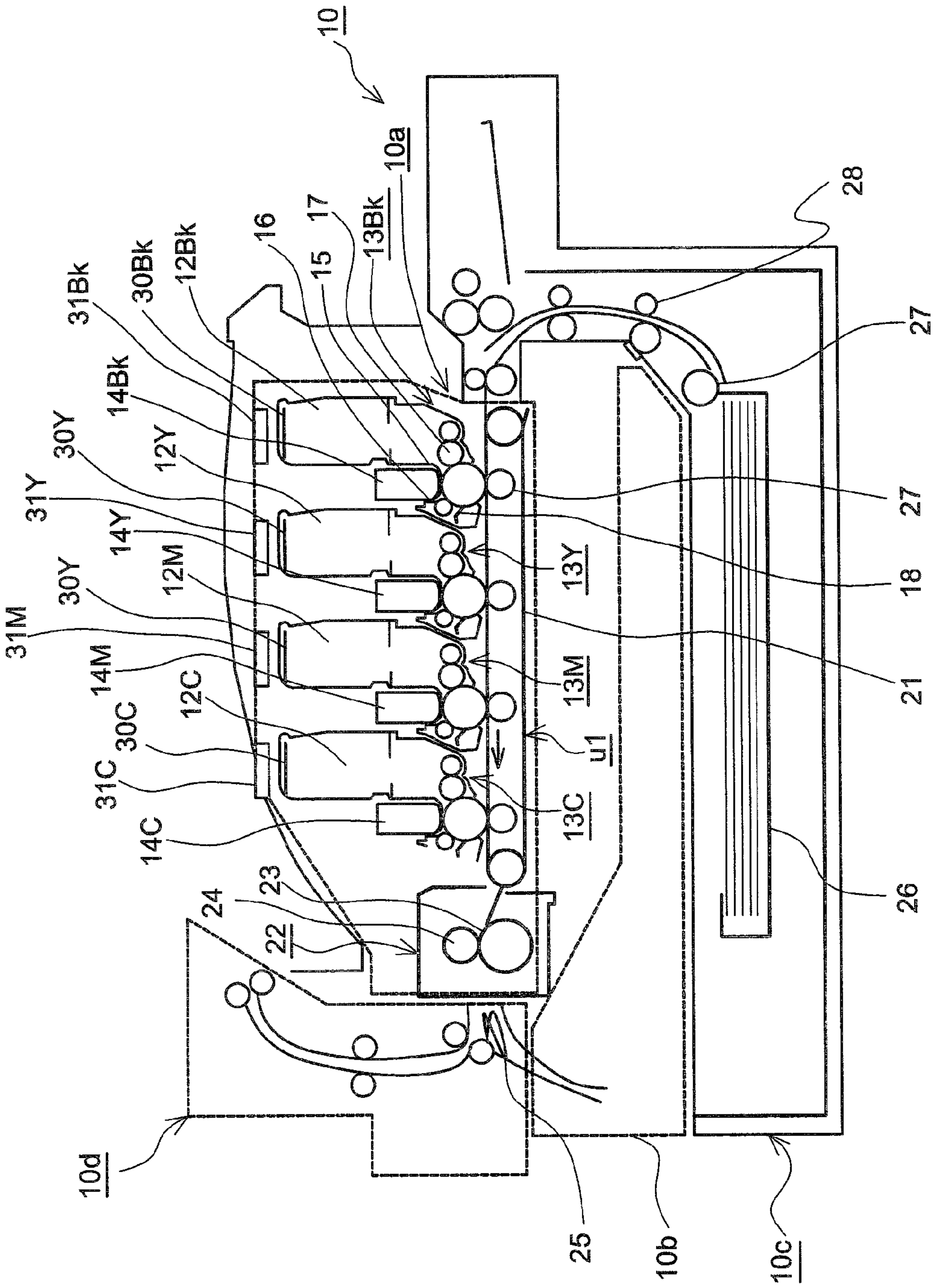
FIG. 3 is a summary diagram showing a printer in embodiment 1 of the present invention.

FIG. 2 is a cubic diagram showing a printer in embodiment 1 of the present invention; and FIG. 3 is a summary diagram showing a printer in embodiment 1 of the present invention.

As shown by FIGS. 2 and 3, in a printer 10, ID units 13Bk, 13Y, 13M and 13C serving as image forming units of four colors, that is, serving as drum cartridges of four colors, are furnished being attachable and removable with respect to the substance body, that is, the apparatus substance of the printer 10. The ID units 13Bk, 13Y, 13M and 13C are furnished from the right side to the left side in the drawings according to an order of black, yellow, magenta and cyan, and execute a color print through subtractive mixture. Moreover, the ID unit 13Bk for black color also can be used for monochrome print.

Further, on the ID units 13Bk, 13Y, 13M and 13C, to correspond to the respective colors, toner cartridges 12Bk, 12Y, 12M and 12C serving as developer cartridges, that is, serving as developer accommodating section, respectively installed being attachable and removable with respect to the substance bodies, that is, the unit substances of the ID units 13Bk, 13Y, 13M and 13C. In the toner cartridges 12Bk, 12Y, 12M and 12C, toners of respective colors are respectively accommodated as developers.

Then, in the toner cartridges 12Bk, 12Y, 12M and 12C, as identification information storing portions, RFID (Radio Frequency Identification) tags 30Bk, 30Y, 30M and 30C are respectively buried so as to be mounted in positions shown by the drawings. In the RFID tags 30Bk, 30Y, 30M and 30C, data are respectively stored as identification information for identifying the toner cartridges 12Bk, 12Y, 12M and 12C. Further, a cover 32 is furnished as opening shutting freely. In positions that are on the cover 32 and respectively correspond to the toner cartridges 12Bk, 12Y, 12M and 12C, antenna sections 31Bk, 31Y, 31M and 31C are respectively furnished as identification information communicating section for performing a reading or a writing of information of the RFID tags 30Bk, 30Y, 30M and 30C.

Moreover, in the embodiment, instead of the toner cartridges 12Bk, 12Y, 12M and 12C, at first time, toner cartridges 12Bk', 12Y', 12M' and 12C' without providing the RFID tags 30Bk, 30Y, 30M and 30C are used to accompany the printer 10 when shipping and to be loaded on the printer 10. That is, the toner cartridges 12Bk, 12Y, 12M and 12C with providing the RFID tags 30Bk, 30Y, 30M and 30C are used to be loaded the printer 10 at and after second time as manufactured exchange parts.

In the embodiment, as exchange parts, the toner cartridges 12Bk, 12Y, 12M and 12C are furnished to be loaded the printer 10 at and after second time. However, as exchange parts, it is possible to use the ID units 13Bk, 13Y, 13M and 13C.

On the printer 10, an operating panel 35 is furnished as an operating section in order to make operator perform various operations. On the operating panel 35, an operating switch 36 made up of plural keys and a liquid crystal displayer 37 serving as a displaying section for executing a predetermined display based on display information outputted from an engine controlling section (print controlling section) are provided.

Then, the printer 10 comprises an image forming section 10*a*, a duplex printing section 10*b*, a paper supplying section 10*c* serving as medium supplying section, and a paper ejecting section 10*d* serving as medium ejecting section. When the cover 32 is shut, LED heads 14Bk, 14Y, 14M and 14C serving as exposing units are made to contact with the ID units 13Bk, 13Y, 13M and 13C.

Further, under the ID units 13Bk, 13Y, 13M and 13C, a transferring unit u1 is furnished. The transferring unit u1 includes a transfer conveying belt 21, and transferring rollers 20 serving as transferring members provided to respectively correspond to the ID units 13Bk, 13Y, 13M and 13C.

In the case, because the toner cartridges 12Bk, 12Y, 12M and 12C have the same structure except the color of the accommodated toner serving as developer and the data of the RFID tags 30Bk, 30Y, 30M and 30C, in the embodiment, the toner cartridge 12Bk will be explained as an example.

In the ID unit 13Bk, a photosensitive body drum 15 serving as an image carrying body, a charging roller 16 serving as a charging device, a developing roller 17 serving as a developer carrying body, a cleaning blade 18 serving as a cleaning device are housed. In the toner cartridge 12Bk, toner is accommodated. The surface of the photosensitive body drum 15 is made of material with optical electro-conductivity. The photosensitive body drum 15 is surrounded by the charging roller 16, the developing roller 17 and the cleaning blade 18 that are sequentially furnished along a rotation direction of the photosensitive body drum 15.

Further, the transferring roller 20 contacts with the photosensitive body drum 15 via the transfer conveying belt 21. The photosensitive body drum 15, with being rotated, is supplied with electric charge from the charging roller 16, so that the surface is charged entirely and uniformly. Then, through an optical writing based on print information from the LED head 14Bk, the photosensitive body drum 15 is exposed, and an electrostatic latent image is formed on the surface of the photosensitive body drum 15. Further, the electrostatic latent image is developed by the developing roller 17, and a toner image is formed as a developer image.

At that time, the toner image formed on the surface of the photosensitive body drum 15 is made of black toner accommodated in the toner cartridge 12Bk. Then, the toner image arrives in a position of the transferring roller 20 with the rotation of the photosensitive body drum 15, and is transferred onto paper as a record medium which is conveyed along an arrow direction with the transfer conveying belt 21 moves just under the photosensitive body drum 15. Moreover, on the paper, not only there is a toner image of black, but also there are toner images of yellow, magenta and cyan, they are transferred and superposed so that a color toner image is formed.

Further, a fixing unit 22 serving as a fixing device is constructed by heating rollers 23 and 24. Then, the paper is conveyed into between the heating rollers 23 and 24. While the paper is sandwiched and conveyed by the heating rollers 23 and 24, the color toner image is dissolved and is fixed onto the paper. Moreover, the paper on which the color toner image is fixed by the fixing unit 22 is conveyed to upside or the duplex printing section 10*b* via a switching plate 25.

Moreover, the paper is supplied by the paper supplying section 10*c*. The paper supplying section 10*c* is constructed by a paper supplying cassette 26, a paper supplying roller 27, a registration roller 28 and the like. The paper is conveyed from the paper supplying cassette 26 to the registration roller 28 with a rotation of the paper supplying roller 27, and is conveyed to the transfer conveying belt 21 at a timing corresponding to the formation of the toner image, then is conveyed by the transferring unit u1.

The following is to explain a controlling device of the printer 10.

Figure 1A:
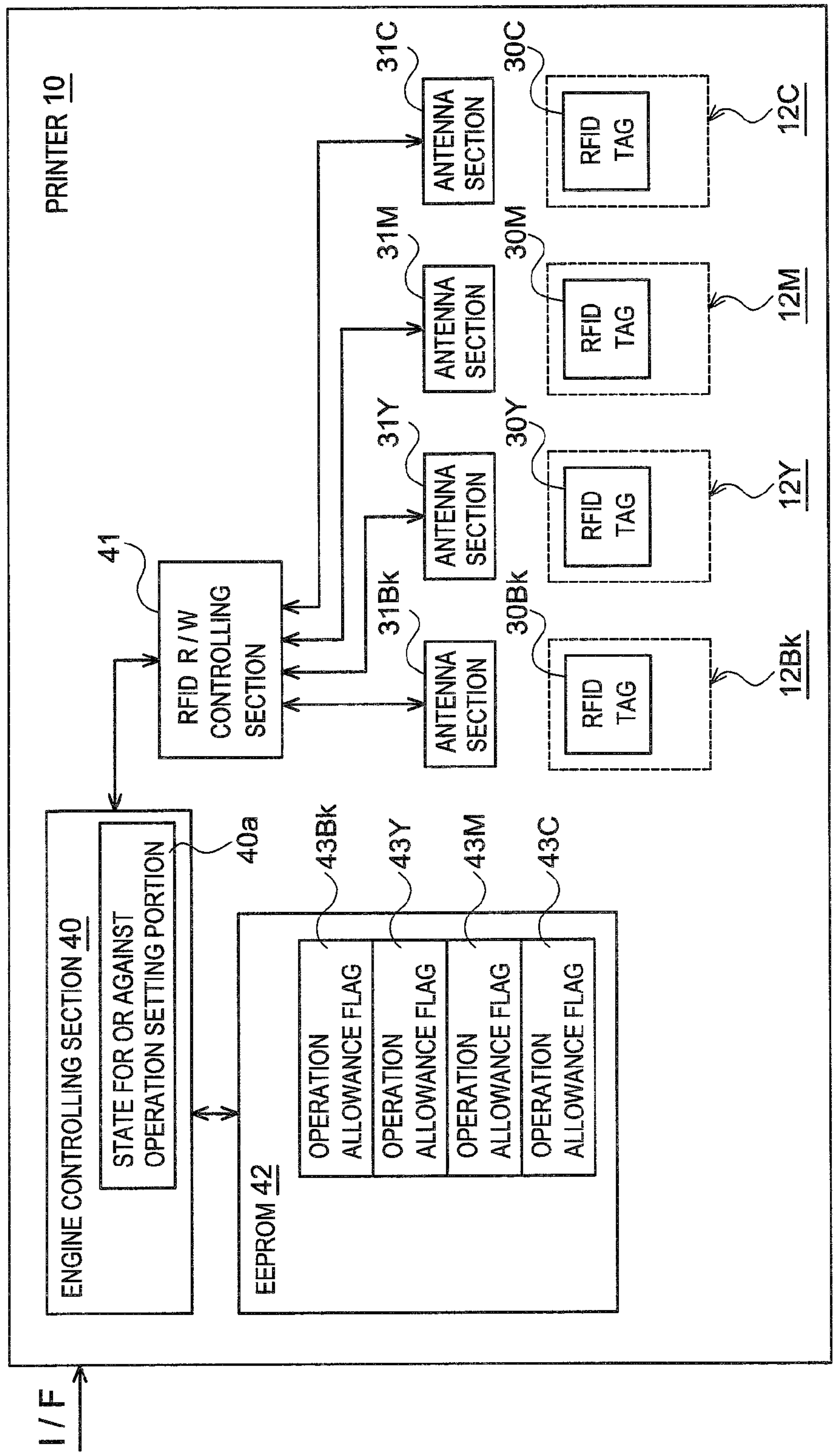
FIG. 1A is a control block diagram of a printer in embodiment 1 of the present invention.
Figure 1B:
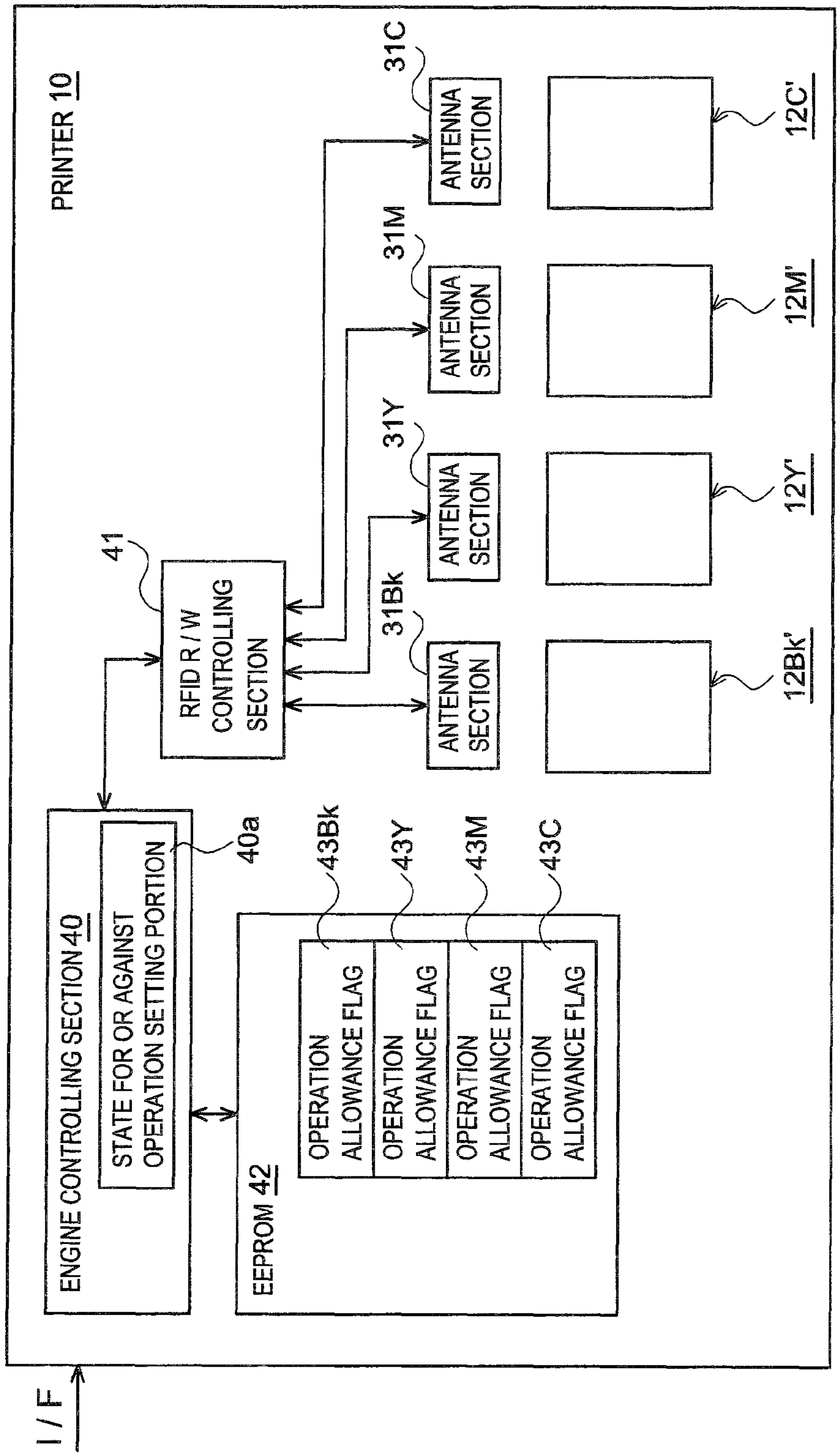
FIG. 1B is a control block showing a shipment state loading toner cartridges 12Bk', 12Y', 12M' and 12C' not holding RFID in embodiment 1 of the present invention.

FIG. 1A is a control block diagram of a printer in embodiment 1 of the present invention; and FIG. 1B is a control block showing a shipment state loading toner cartridges 12Bk', 12Y', 12M' and 12C' not holding RFID in embodiment 1 of the present invention.

As shown by the drawing, an engine controlling section 40 is furnished in order to execute a control of the printer 10. A RFID R/W controlling section 41 for controlling the reading and writing of data of the respective RFID tags 30Bk, 30Y, 30M and 30C is connected with the engine controlling section 40. The antenna sections 31Bk, 31Y, 31M and 31C for respectively executing communications of the RFID tags 30Bk, 30Y, 30M and 30C built in the respective toner cartridges 12Bk, 12Y, 12M and 12C are respectively connected with the RFID R/W controlling section 41.

Further, a non-volatility memory serving as a state for or against operation storing section, for example, an EEPROM 42 is connected with in order to store state for or against operation of the printer 10. In the EEPROM 42 serving an area to store information indicating whether to allow image formation i.e. print, operation allowance flags 43Bk, 43Y, 43M and 43C serving as operation allowance indexes are stored to correspond to the respective toner cartridges 12Bk, 12Y, 12M and 12C. Moreover, in the embodiment, the operation allowance flags 43Bk, 43Y, 43M and 43C are set into “0” when the print is allowed, or are set into “1” when the print is not allowed.

Furthermore, in the engine controlling section 40, a state for or against operation setting portion 40*a* is provided as a state for or against operation setting process means. The state for or against operation setting portion 40*a* executes a state for or against operation setting process, so as to execute a set of state for or against operation, that is, a set whether to allow print.

The next is to explain operation of the printer 10 comprising the above-stated structure.

Here, z (z=0, 1, 2, 3) is a control variable to indicate the colors of black, yellow, magenta and cyan. "0" indicates black, "1" indicates yellow, "2" indicates magenta, "3" indicates cyan, the control variable z is increased by counting. Therefore, RFID tag (0), RFID tag (1), RFID tag (2), RFID tag (3) respectively indicate the RFID tags 30Bk, 30Y, 30M and 30C, and operation allowance flag (0), operation allowance flag (1), operation allowance flag (2), operation allowance flag (3) respectively indicates the operation allowance flags 43Bk, 43Y, 43M and 43C.

Firstly, it will be explained regarding operation of the engine controlling section 40 when initializing the EEPROM 42 at shipment stage of the printer 10.

Figure 4:
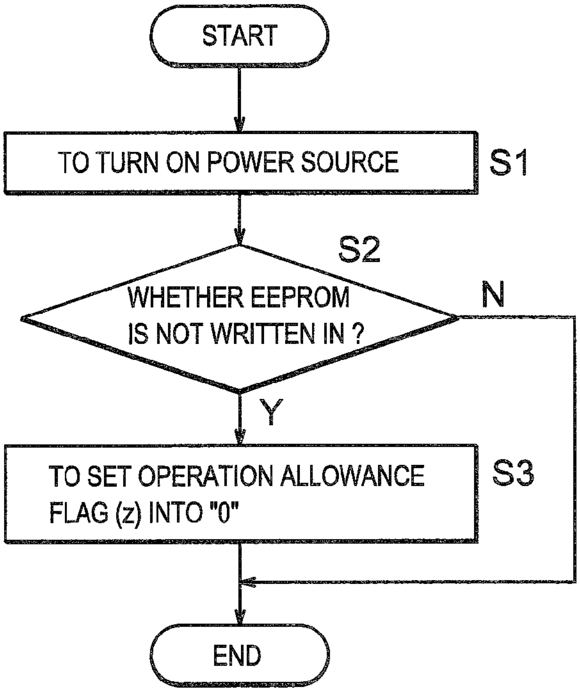
FIG. 4 is a flowchart showing operation of an engine controlling section while shipping in a printer of embodiment 1 of the present invention.

FIG. 4 is a flowchart showing operation of an engine controlling section while shipping in a printer of embodiment 1 of the present invention.

First, when operator turns on power source of the printer 10, an initialization processing section serving as an operation allowing process portion of the engine controlling section 40 performs an initialization process as an operation allowance process. The initialization processing section performs a read with respect to the EEPROM 42 and judges whether the EEPROM 42 is not written. If the EEPROM 42 is not written, the initialization processing section initializes the EEPROM 42 and writes a writing end flag into the EEPROM 42, then sets the operation allowance flags (z) into "0" as a default value.

Therefore, at the shipment stage of the printer 10, the printer 10 is set into such state that print is allowed.

Next, it will be explained regarding flowchart.

Step S1: To turn on the power source of the printer 10;

Step S2: The engine controlling section 40 reads a print writing flag from the EEPROM 42 and judges whether the EEPROM 42 is in a without writing state. If the EEPROM 42 is in a without writing state, step S3 will be carried out, if the EEPROM 42 is not in a without writing state, the flowchart process will be ended.

Step S3: The engine controlling section 40 sets an operation allowance flags (z) in the EEPROM 42 into "0" which indicates an operation allowance state, and ends initialization operation process at shipment stage.

Continuously, it will be explained regarding operation of the engine controlling section 40 after shipment of the printer 10.

Figure 5:
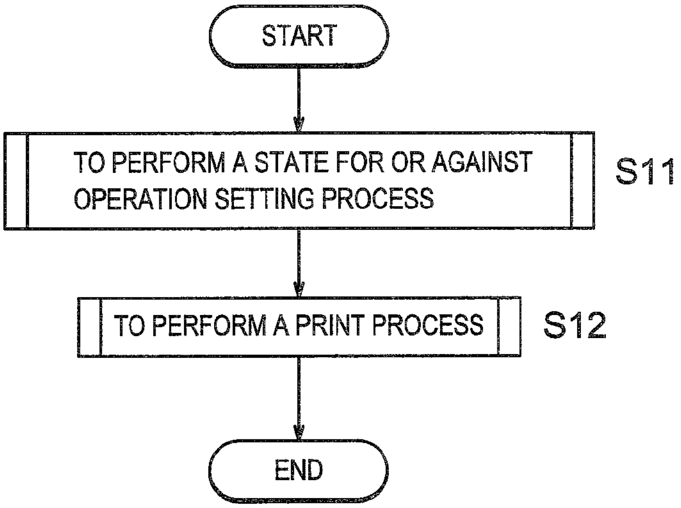
FIG. 5 is a main flowchart showing operation of an engine controlling section after shipping in a printer of embodiment 1 of the present invention.

FIG. 5 is a main flowchart showing operation of an engine controlling section after shipping in a printer of embodiment 1 of the present invention.

First, the state for or against operation setting portion 40*a* performs a state for or against operation setting process. The state for or against operation setting portion 40*a* judges whether the RFID tags (z) respectively corresponding to the toner cartridges 12Bk, 12Y, 12M and 12C, or, the toner cartridges 12Bk', 12Y', 12M' and 12C' are provided; and judges whether the respective operation allowance flags (z) are "0" or are "1"; then sets the operation allowance flags (z) on the basis of the judgment results.

Then, a printing process portion serving as an image formation processing means of the engine controlling section 40 performs a print process serving as an image formation process. The printing process portion performs a print on the basis of a judgment result of the operation allowance flags (z).

Next, it will be explained regarding flowchart.

Step S11: To perform a state for or against operation setting process;

Step S12: To perform a print process and end the flowchart process.

Next, it will be explained regarding a subroutine of a state for or against operation setting process in step S11 of the FIG. 5.

Figure 6:
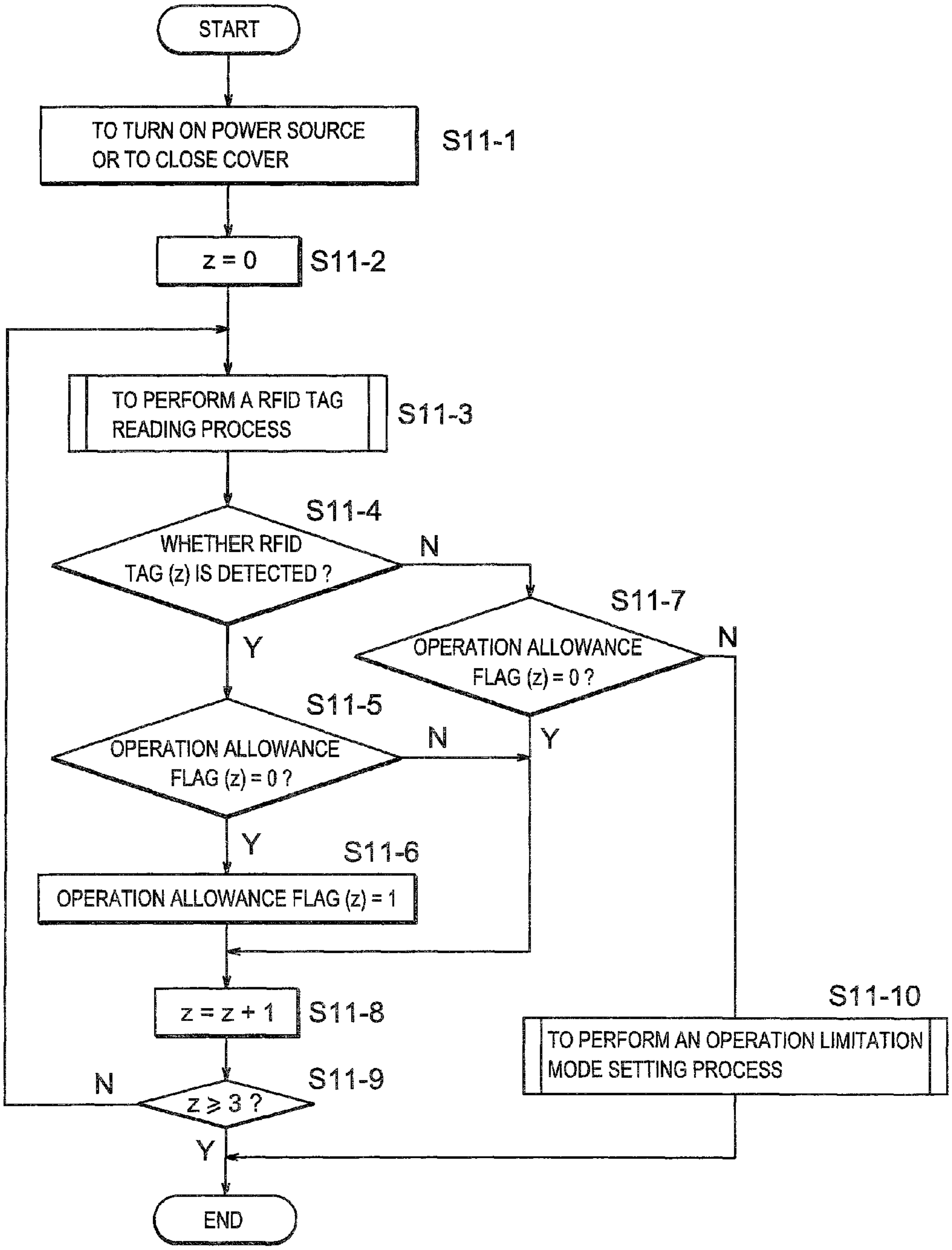
FIG. 6 is a diagram showing a subroutine of a state for or against operation setting process in embodiment 1 of the present invention.

FIG. 6 is a diagram showing a subroutine of a state for or against operation setting process in embodiment 1 of the present invention.

First, at a timing when the power source of the printer 10 is turned on or when the cover 32 is closed, the RFID R/W controlling section 41 performs a reading process of respective data of the RFID tags 30Bk, 30Y, 30M and 30C. This is because: when the toner cartridges 12Bk, 12Y, 12M and 12C are exchanged, there is a very high possibility to turn on the power source or to close the cover 32.

Second, the state for or against operation setting portion 40*a* sets the control variable z into "0". Then, a RFID tag reading process part serving as an identification information obtaining process means of the state for or against operation setting portion 40*a* performs a RFID tag reading process serving as an identification information obtaining process. The RFID tag reading process part reads out data of the RFID tag (z) on the basis of the control variable z. Further, a detecting and judging process part of the state for or against operation setting portion 40*a*, as a detecting process means for identification information storing portion, performs a tag detection judgment process serving as a detection process for identification information storing portion. The detecting and judging process part judges whether the RFID tag (z) is detected or not on the basis of the read data.

On the one hand, in the case that the RFID tag (z) is not detected, a state for or against operation judging process part of the state for or against operation setting portion 40*a* performs a state for or against operation judgment process. The state for or against operation judging process part judges that the toner cartridges 12Bk', 12Y', 12M' and 12C' are mounted at the shipment stage of the printer 10, and judges whether the operation allowance flags (z) are "0" or not.

Then, in the case that the operation allowance flag (z) is "1", according to that the RFID tag (z) is not detected and the operation allowance flag (z) is "1" indicating a print non-allowance state, an operation limitation mode setting process part of the state for or against operation setting portion 40*a* performs an operation limitation mode setting process. The operation limitation mode setting process part judges that there is not the RFID tag and error happened, and sets into an operation limitation mode for limiting print operation. Moreover, an error operation limiting process part of the state for or against operation setting portion 40*a* records to the engine controlling section 40 that the operation limitation mode is set.

Further, in the case that the operation allowance flag (z) is "0", according to that the RFID tag (z) is not detected and the operation allowance flag (z) is "0" indicating a print allowance state, the state for or against operation judging process part judges that the toner cartridges 12Bk', 12Y', 12M' and 12C' are mounted at the shipment stage of the printer 10.

On the other hand, in the case that the RFID tag (z) is detected, the state for or against operation judging process part judges whether the RFID tag (z) is detected for the first time according to that the operation allowance flag (z) is "0" or not. Then, in the case that the operation allowance flag (z) is "0", the state for or against operation judging process part judges that the RFID tag (z) is detected for the first time, that is, judges that the toner cartridges 12Bk', 12Y', 12M' and 12C' of shipment stage have been consumed and the toner cartridges 12Bk, 12Y, 12M and 12C are firstly exchanged and mounted. Continuously, an operation allowance index setting process part of the state for or against operation setting portion 40*a* performs an operation allowance index setting process to set "1" into the operation allowance flag (z). Therefore, in the case that the RFID tags (z) can not be detected after the toner cartridges 12Bk, 12Y, 12M and 12C are exchanged, the operation limitation mode setting process part judges that the toner cartridges 12Bk', 12Y', 12M' and 12C' are not pure parts or recommended parts, and sets into the operation limitation mode to limit print operation.

Thus, to correspond to the respective, the detection of the RFID tag (z) and the judgment and change of the operation allowance flag (z) are performed.

Next, it will be explained regarding flowchart.

Step S11-1: To turn on the power source or to close the cover 32.

Step S11-2: To set the control variable z into "0".

Step S11-3: To perform a RFID tag reading process.

Step S11-4: To judge whether the RFID tag (z) is detected. If it is detected, step S11-5 is carried out; and if it is not detected, step S11-7 is carried out.

Step S11-5: To judge whether the operation allowance flag (z) is "0" indicating a state to allow operating or not. If it is "0", step S11-6 is carried out; and if it is not "0", step S11-8 is carried out.

Step S11-6: To set the operation allowance flag (z) into "1".

Step S11-7: To judge whether the operation allowance flag (z) is "0" indicating a state to allow operating or not. If it is "0", step S11-8 is carried out; and if it is not "0", step S11-10 is carried out.

Step S11-8: To perform an increment with respect to the control variable z.

Step S11-9: To judge whether the control variable z is or above "3". If the control variable z is or above "3", the flowchart process is ended; If the control variable z is smaller than "3", the process returns the step S11-3.

Step S11-10: To perform an operation limitation mode setting process, then end the flowchart process.

Next, it will be explained regarding a subroutine of a printing process in step S5 of FIG. 5.

Figure 7:
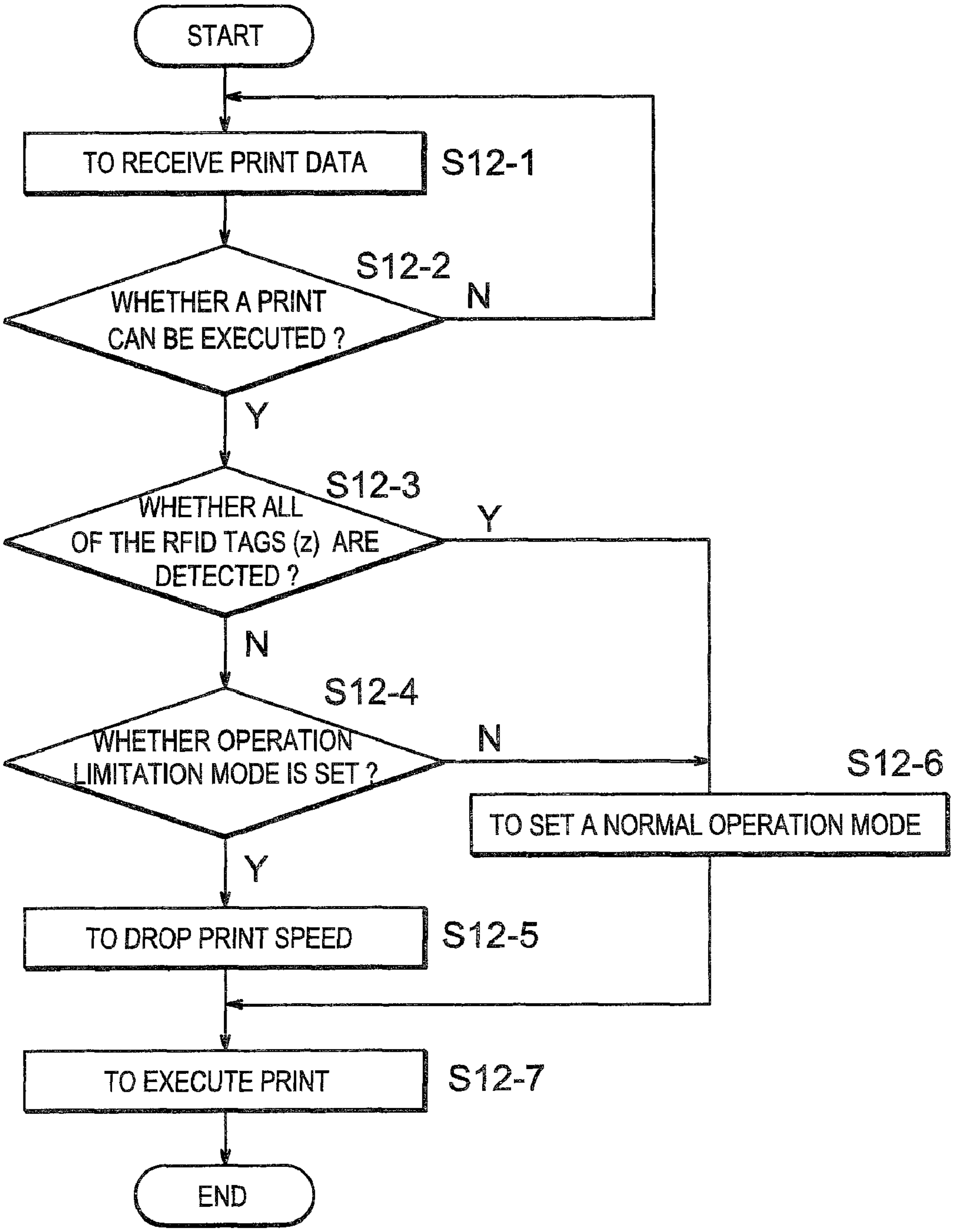
FIG. 7 is a diagram showing a subroutine of a printing process in embodiment 1 of the present invention.

FIG. 7 is a diagram showing a subroutine of a printing process in embodiment 1 of the present invention.

The above-stated printing process portion starts to receive print command and print data from a host computer, and judges whether a print can be executed after received print data of one page part of paper.

When the print becomes possible, a tag detecting and judging process part of the printing process portion performs a tag detecting and judging process. The tag detecting and judging process part reads data of the RFID tags (z), and judges whether all of the RFID tags (z) are detected or not on the basis of the read data. In the case that all of the RFID tags (z) are detected, because it is possible to judge that the toner cartridges 12Bk, 12Y, 12M and 12C are the pure parts or the recommended parts, the above-stated operation allowing process portion allows an image formation, a normal operation mode setting process part of the printing process portion performs a normal operation mode setting process. The normal operation mode setting process part sets into a normal operation mode to allow print.

Further, in the case that one of the RFID tags (z) is not detected, a mode judging process part of the printing process portion performs a mode judging process. The mode judging process part judges whether the setting of the operation limitation mode is recorded in the state for or against operation setting portion 40*a* or not, if the setting of the operation limitation mode is recorded, drops the print speed to 50% of normal print speed and executes print operation.

Continuously, a print executing process part of the printing process portion performs a print executing process to execute a print.

Thus, because it is possible to execute print without relating to data of RFID tags (z) at shipment stage of the printer 10, it is unnecessary to provide the RFID tags (z) into the toner cartridges 12Bk', 12Y', 12M' and 12C' of shipment stage. Therefore, it is possible to reduce the cost of the toner cartridges 12Bk, 12Y, 12M and 12C.

Further, when installing the toner cartridges 12Bk, 12Y, 12M and 12C as exchange parts, it is possible to judge whether the RFID tags (z) are respectively provided in the toner cartridges 12Bk, 12Y, 12M and 12C, and to judge whether the toner cartridges 12Bk, 12Y, 12M and 12C are pure parts or recommended parts on the basis of the data of the RFID tags (z).

Therefore, it is possible to perform print without drop image quality or performance of image formation.

Further, when the toner cartridges 12Bk, 12Y, 12M and 12C are imitational parts, similar parts or the like, because it is possible to drop print speed to execute print, the damage of the printer 10 caused by the imitational parts or the similar parts can be prevented.

Next, it will be explained regarding flowchart.

Step S12-1: To receive print data.

Step S12-2: To judge whether a print can be executed. If the print becomes possible, step S12-3 is carried out; if the print is not possible, the flowchart process returns to step S12-1.

Step S12-3: To judge whether all of the RFID tags (z) are detected or not. If all of the RFID tags (z) are detected, step S12-6 is carried out; if all of the RFID tags (z) are not detected, step S12-4 is carried out.

Step S12-4: To judge whether an operation limitation mode is set or not. If the operation limitation mode is set, step S12-5 is carried out; if the operation limitation mode is not set, step S12-6 is carried out.

Step S12-5: To drop print speed.

Step S12-6: To set a normal operation mode.

Step S12-7: To execute print and end the flowchart process.

In the printer 10 with the above-stated structure, only in the case that the EEPROM 42 is not written, when all of the operation allowance flags (z) are set into "0", there is a possibility to impossibly deal with repair part or the like. Here, in the embodiment, through sending the command to the printer 10 from the host computer, it is possible to set the respective operation allowance flags (z) into "0".

Figure 8:
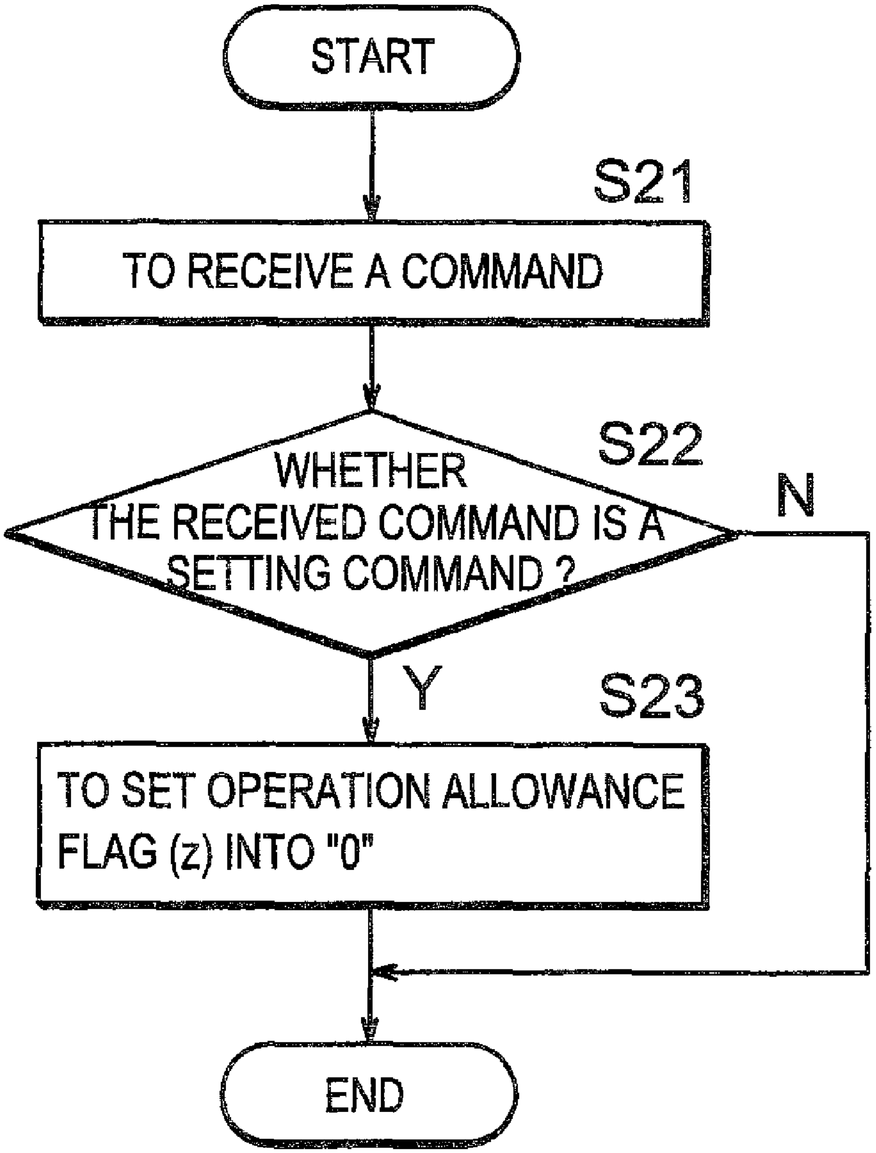
FIG. 8 is a flowchart showing operation of an operation allowance index setting process part in embodiment 1 of the present invention.

FIG. 8 is a flowchart showing operation of an operation allowance index setting process part in embodiment 1 of the present invention.

First, when the printer 10 received a command from a host computer, the received command is judged whether being a setting command (PCL command) of the operation allowance flags (z). Then, in the case that the received command is the setting command (PCL command) of the operation allowance flags (z), the above-stated operation allowance index setting process part sets the operation allowance flags (z) into "0".

Next, it will be explained regarding flowchart.

Step S21: To receive a command.

Step S22: To judge whether the received command is a setting command of the operation allowance flags (z). If it is, step S23 is carried out; and if it is not, the flowchart process is ended.

Step S23: To set the operation allowance flags (z) into "0" indicating an operation allowance state, and end the flowchart process.

<Embodiment 2>

The following is to explain an embodiment 2 of the present invention. Moreover, regarding the same composition as the embodiment 1, it will be assigned the same symbol and the corresponding explanation will be omitted. Further, regarding the effect of present invention obtained by the same compositions, it will be applied to the embodiment 2.

Figure 9A:
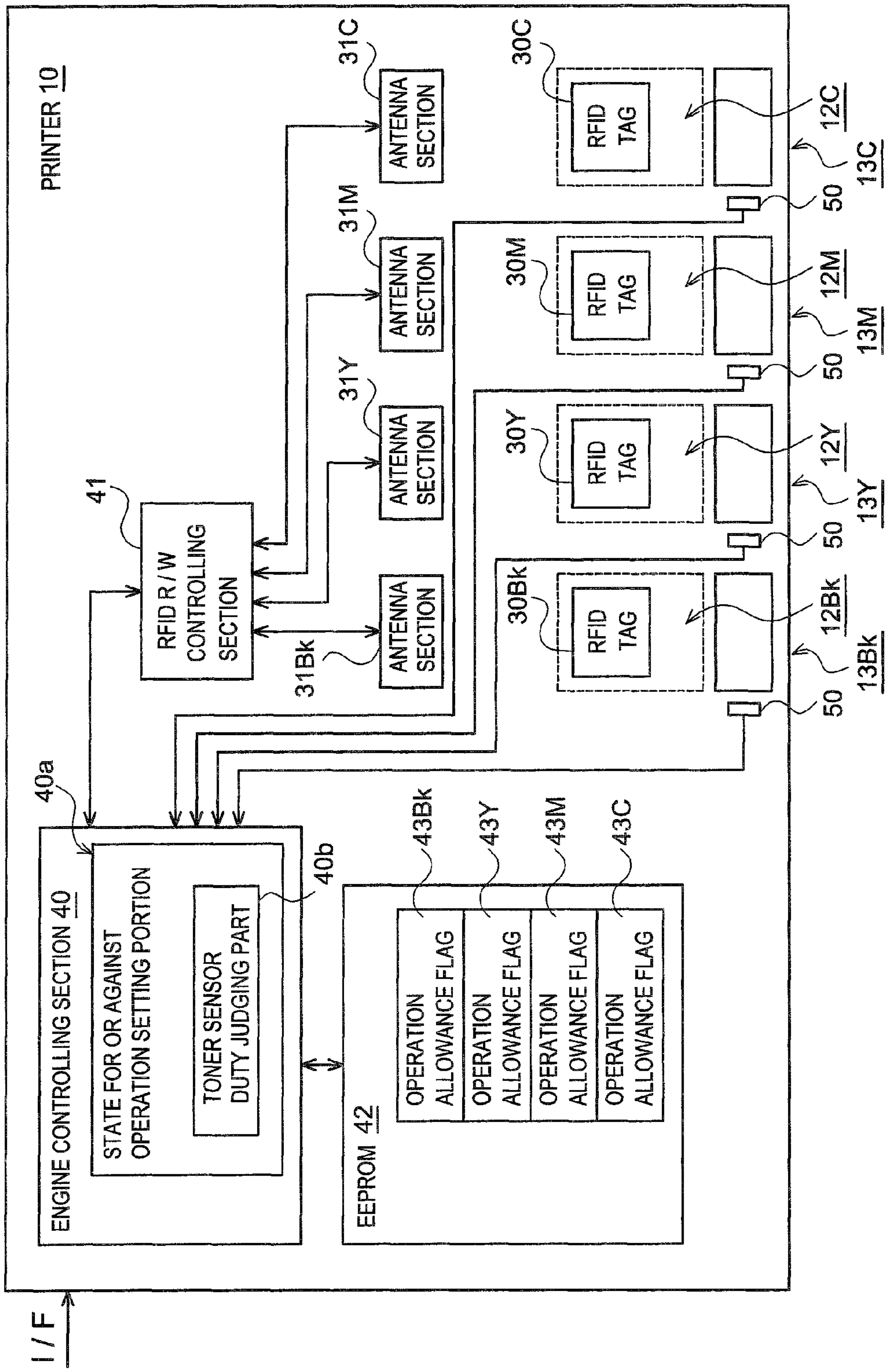
FIG. 9A is a control block diagram of a printer in embodiment 2 of the present invention.
Figure 9B:
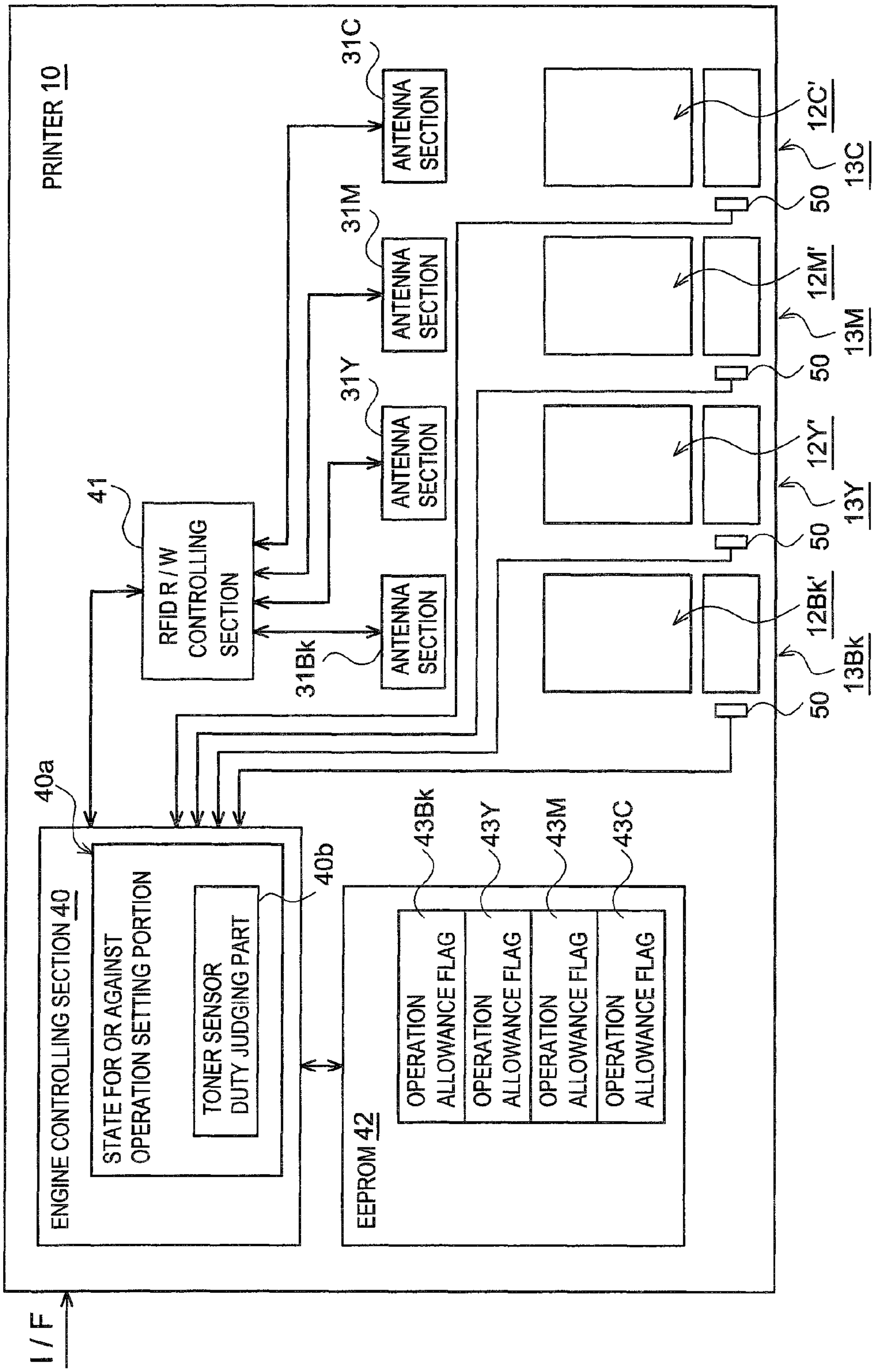
FIG. 9B is a control block showing a shipment state loading toner cartridges 12Bk', 12Y', 12M' and 12C' not holding RFID in embodiment 2 of the present invention.

FIG. 9A is a control block diagram of a printer in embodiment 2 of the present invention; and FIG. 9B is a control block showing a shipment state loading toner cartridges 12Bk', 12Y', 12M' and 12C' not holding RFID in embodiment 2 of the present invention.

As shown by the drawings, in the ID units 13Bk, 13Y, 13M and 13C, respective toner sensors 50 are provided as a developer detecting section. The toner sensor 50 is used to detect toner amount. Further, in the state for or against operation setting portion 40*a*, a toner sensor duty judging part 40*b* is provided as a duty judging process means.

Next, it will be explained regarding the ID units 13Bk, 13Y, 13M and 13C. Because the structures of the ID units 13Bk, 13Y, 13M and 13C are the same, so only the ID unit 13Bk is explained.

Figure 10:
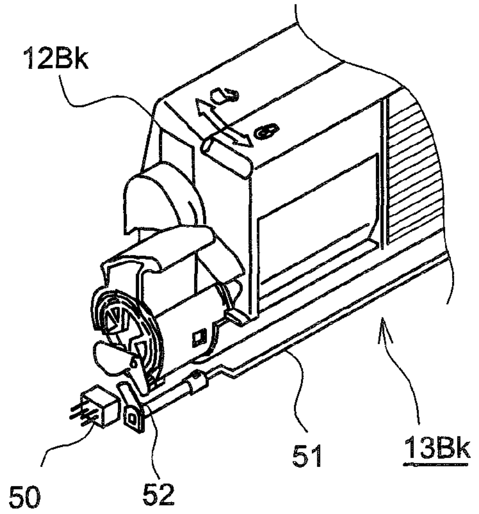
FIG. 10 is a cubic diagram showing an installation state of toner sensor in embodiment 2 of the present invention.
Figure 11:
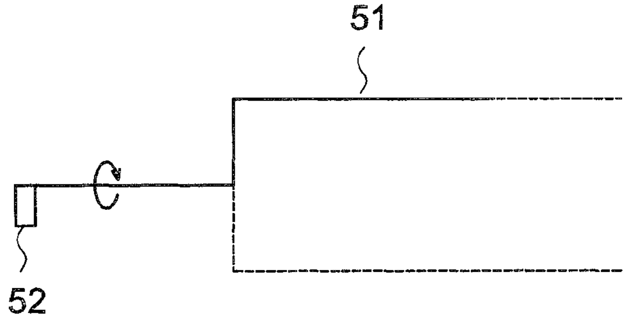
FIG. 11 is a first diagram showing operation of a stirring lever in embodiment 2 of the present invention.
Figure 12:
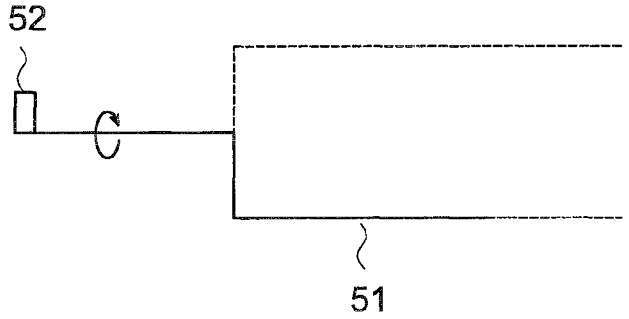
FIG. 12 is a second diagram showing operation of a stirring lever in embodiment 2 of the present invention.

FIG. 10 is a cubic diagram showing an installation state of toner sensor in embodiment 2 of the present invention; FIG. 11 is a first diagram showing operation of a stirring lever in embodiment 2 of the present invention; and FIG. 12 is a second diagram showing operation of a stirring lever in embodiment 2 of the present invention.

As shown by the drawings, the ID unit 13Bk is placed on lower part of the toner cartridge 12Bk, in the unit substance body of the ID unit 13Bk, a stirring lever 51 to stir toner is furnished rotating-freely. The stirring lever 51 is interlocked to rotate with a rotation of the developing roller 17 (FIG. 3) in the ID unit 13Bk, and has a structure capable of freely falling down to rotate with respect to a rotation direction. On one edge of the stirring lever 51, a reflecting board 52 is furnished.

Further, on the apparatus substance body side, in a position facing to the reflecting board 52, the toner sensor 50 made up of optical sensor with reflection type is furnished. A sensor output of the toner sensors 50 is sent to the engine controlling section 40, and the toner sensor duty judging part 40*b* performs a duty judging process to receive the sensor output and execute a duty judgment of output waveform.

Next, it will be explained regarding operation of the printer 10 with the above-stated structure.

First, an operation state of the stirring lever 51 is detected by the toner sensors 50, then a toner amount is detected on the basis of the detected operation state. The stirring lever 51 links with the rotation of the developing roller 17 to rotate in a predetermined cycle T.

Through the stirring lever 51 does not fall to a smallest height by it's own weight after arrived at a largest height in the case that the toner amount is much, on the contrary, when the toner amount becomes little and toner is not to touch with the stirring lever 51, because the stirring lever 51 can freely rotate along a rotation direction after arrived at the largest height, it falls to the smallest height by it's own weight.

Further, because the reflecting board 52 is furnished so that the stirring lever 51 faces to the toner sensors 50 in a position that the stirring lever 51 falls to the smallest height, in the case that the toner amount is much, the time that the reflecting board 52 is facing to the toner sensors 50 becomes short; and in the case that the toner amount is little, the time that the reflecting board 52 is facing to the toner sensors 50 becomes long. Then, in the case that the reflecting board 52 is in the position facing to the toner sensors 50, the sensor output of the toner sensors 50 becomes low level; in the case that the reflecting board 52 is not in the position facing to the toner sensors 50, the sensor output of the toner sensors 50 becomes high level.

Figure 13:
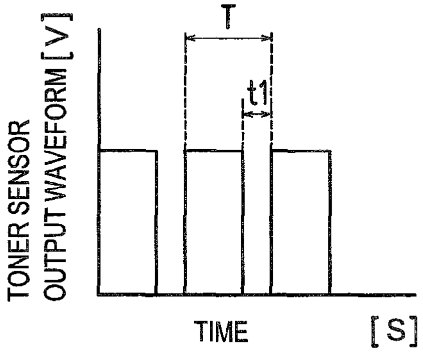
FIG. 13 is a diagram showing an output waveform of toner sensor when toner is in full state in embodiment 2 of the present invention.
Figure 14:
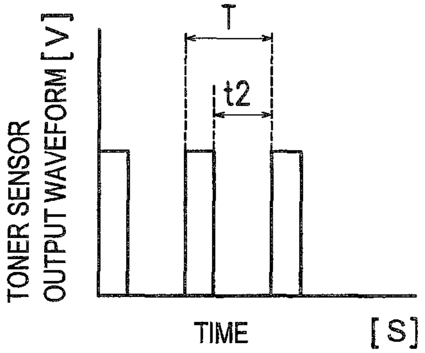
FIG. 14 is a diagram showing an output waveform of toner sensor when toner is in low state in embodiment 2 of the present invention.

FIG. 13 is a diagram showing an output waveform of toner sensor when toner is in full state in embodiment 2 of the present invention; and FIG. 14 is a diagram showing an output waveform of toner sensor when toner is in low state in embodiment 2 of the present invention. Moreover, in the drawings, a horizontal axis is used for time, and a vertical axis is used for output waveform of the toner sensors 50.

In the output waveform of the toner sensors 50, when the toner amount is much, as shown by FIG. 13, a pulse width t1 of low level is short; when the toner amount is less than a predetermined amount, as shown by FIG. 14, a pulse width t2 of low level is long.

Figure 15:
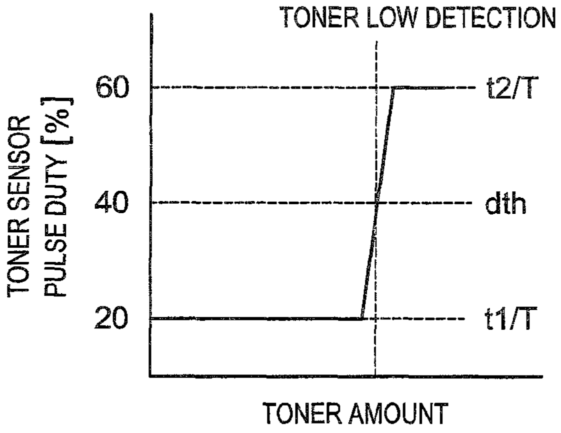
FIG. 15 is a relation diagram between toner amount and toner sensor pulse duty in embodiment 2 of the present invention.

FIG. 15 is a relation diagram between toner amount and toner sensor pulse duty in embodiment 2 of the present invention. Moreover, in the drawings, a horizontal axis is used for toner amount, and a vertical axis is used for toner sensor pulse duty.

As shown by the drawing, when the toner amount is not reduced yet, the toner sensor pulse duty of t1/T is 20[%]; when the toner amount is less than a predetermined amount, the toner sensor pulse duty of t1/T is 60[%]. According to such results, a threshold value dth of toner low detection is set into an intermediate value of 40[%].

Figure 16:
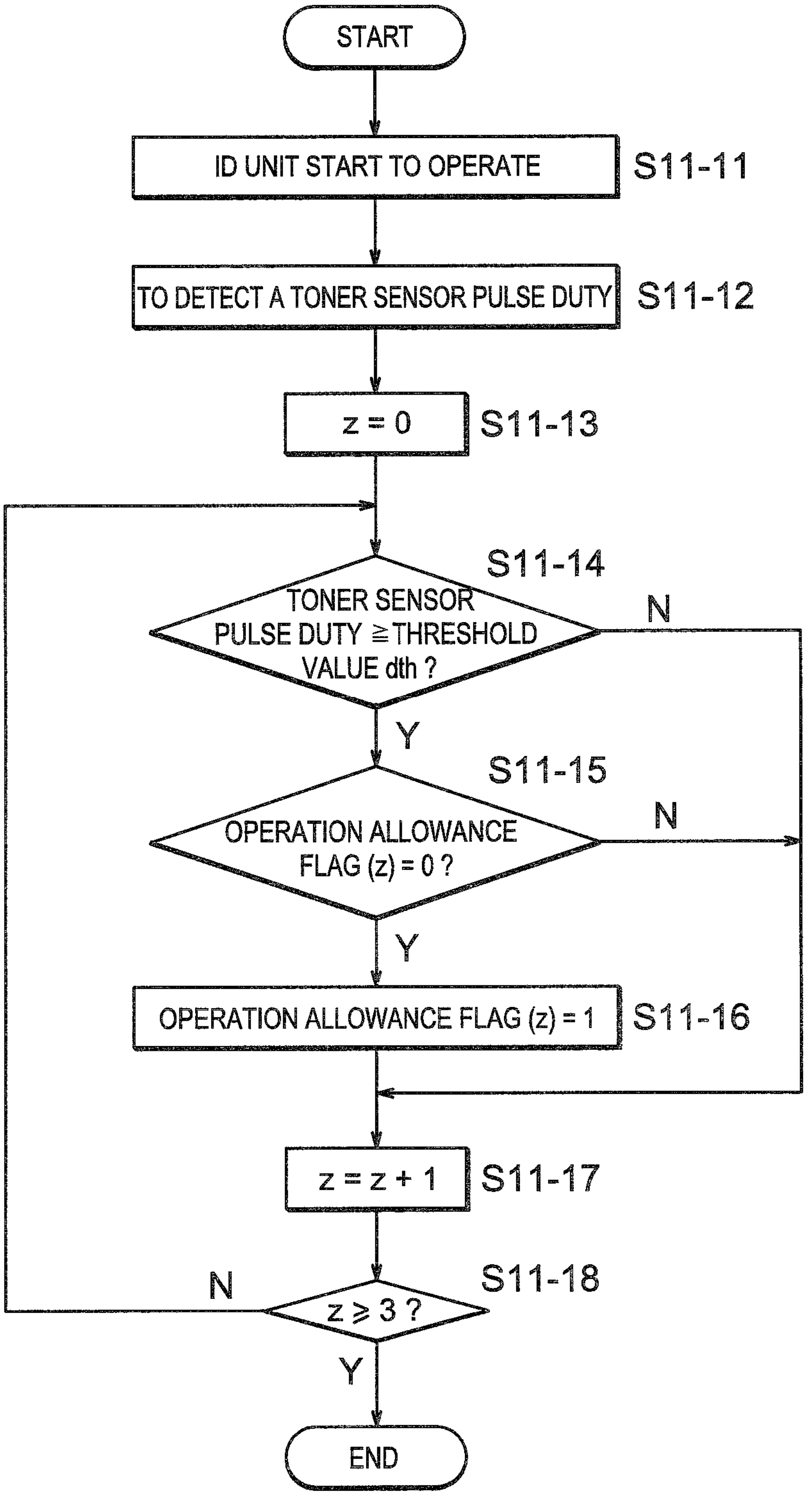
FIG. 16 is a diagram showing a subroutine of a state for or against operation setting process in embodiment 2 of the present invention.

FIG. 16 is a diagram showing a subroutine of a state for or against operation setting process in embodiment 2 of the present invention.

First, when the ID units 13Bk, 13Y, 13M and 13C start to operate, a duty detecting process part of the state for or against operation setting portion 40*a* performs a duty detecting process. The duty detecting process part reads the sensor output of the toner sensors 50, detects the toner sensor pulse duty, and sets the control variable z into "0".

Continuously, the toner sensor duty judging part 40*b* reads the toner sensor pulse duty, and judges whether the toner sensor pulse duty is or above the threshold value dth or not. In the case that the toner sensor pulse duty is or above the threshold value dth, the state for or against operation judging process part judges whether the operation allowance flags (z) is "0" or not. In the case that the toner sensor pulse duty is smaller than the threshold value dth, a toner low state is judged, then it is judged whether the operation allowance flags (z) is "0" or not, if the operation allowance flags (z) is "0", the operation allowance index setting process part of the state for or against operation setting portion 40*a* performs an operation allowance index setting process to set the operation allowance flags (z) into "1".

In the case, the engine controlling section 40, after the toner low state is judged, when the toner cartridges 12Bk', 12Y', 12M' and 12C' without providing the RFID tags 30Bk, 30Y, 30M and 30C are newly mounted, does not allow to print.

As stated above, in the embodiment, after performed an initialization process, though print is allowed in a predetermined period, because the print is not allowed when the respective toner amounts of the toner cartridges 12Bk, 12Y, 12M and 12C become less than a predetermined amount, so even if there is a special use state that the operator, for example, uses imitational parts or similar parts of the toner cartridges 12Bk, 12Y, 12M and 12C from the beginning after the shipment of the printer 10, according to the reduction of the toner amount because of print, it is possible to shift to a mode not to allow print. So it is possible to surely perform a management of the toner cartridges 12Bk, 12Y, 12M and 12C.

Next, it will be explained regarding flowchart.

Step S11-11: ID units 13Bk, 13Y, 13M and 13C start to operate.

Step S11-12: To detect a toner sensor pulse duty.

Step S11-13: To set a control variable z into "0".

Step S11-14: To judge whether the toner sensor pulse duty is or above a threshold value dth or not. In the case that the toner sensor pulse duty is or above the threshold value dth, step S11-15 is carried out; in the case that the toner sensor pulse duty is smaller than the threshold value dth, step S11-17 is carried out.

Step S11-15: To judge whether the operation allowance flags (z) is "0" indicating to allow print or not. If the operation allowance flags (z) is "0" indicating to allow print, step S11-16 is carried out; If the operation allowance flags (z) is not "0" indicating to allow print, step S11-17 is carried out.

Step S11-16: To set the operation allowance flags (z) into "1".

Step S11-17: To increase the control variable z.

Step S11-18: To judge whether the control variable z is or above "3" or not. If the control variable z is or above "3", the flowchart process is ended; if the control variable z is smaller than "3", the flowchart process returns to step S11-14.

In the embodiment 1, in the case that the RFID tag (z) is detected, it is possible to set the operation allowance flags (z) into "1". Further, in the embodiment 2, when it becomes toner low state, it is possible to shift to a mode not to allow print.

<Embodiment 3>

The following is to explain an embodiment 3 of the present invention. Moreover, regarding the same composition as the embodiments 1 and 2, it will be assigned the same symbol and the corresponding explanation will be omitted. Further, regarding the effect of present invention obtained by the same compositions, it will be applied to the embodiment 3.

Figure 17A:
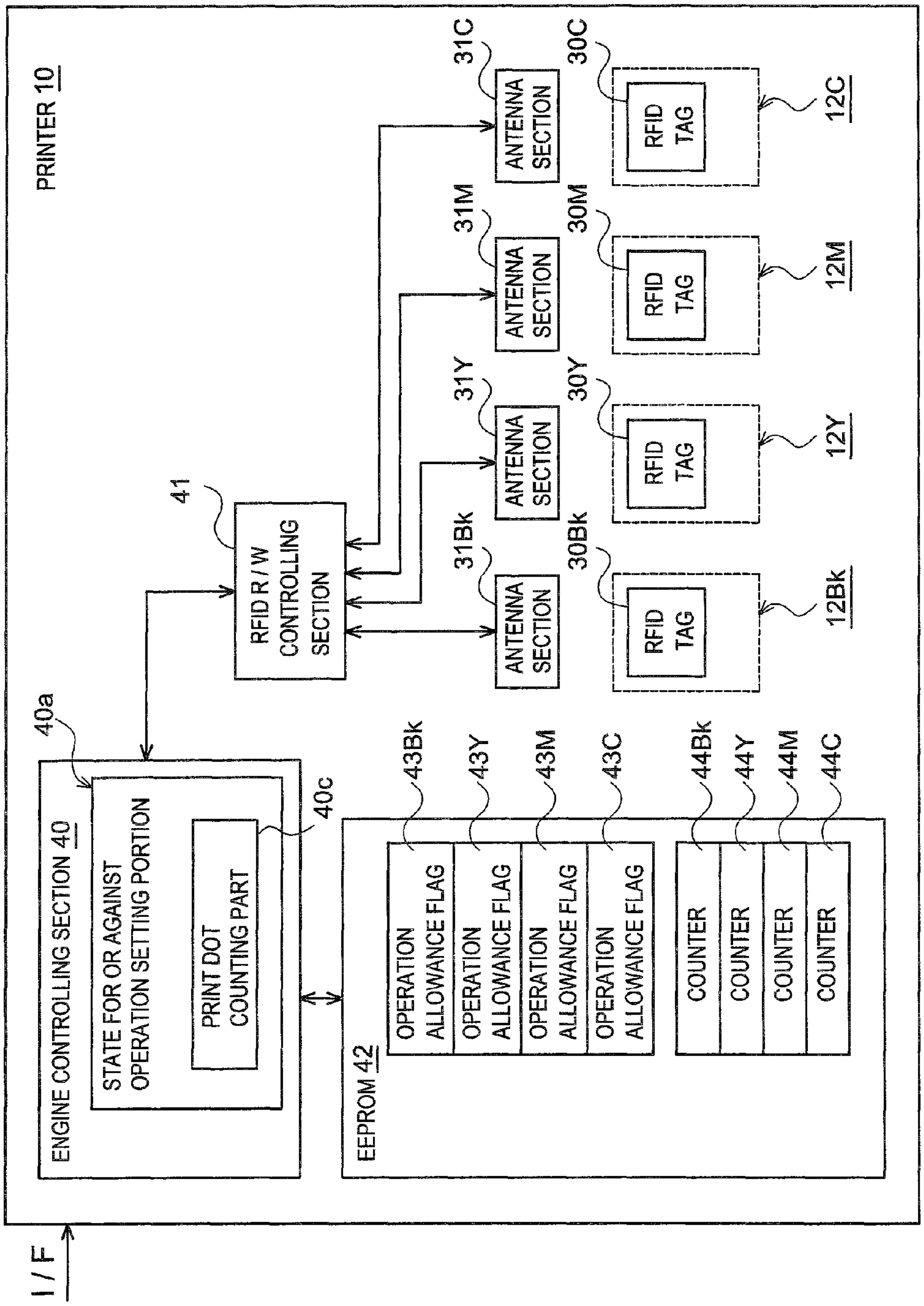
FIG. 17A is a control block diagram of a printer in embodiment 3 of the present invention.
Figure 17B:
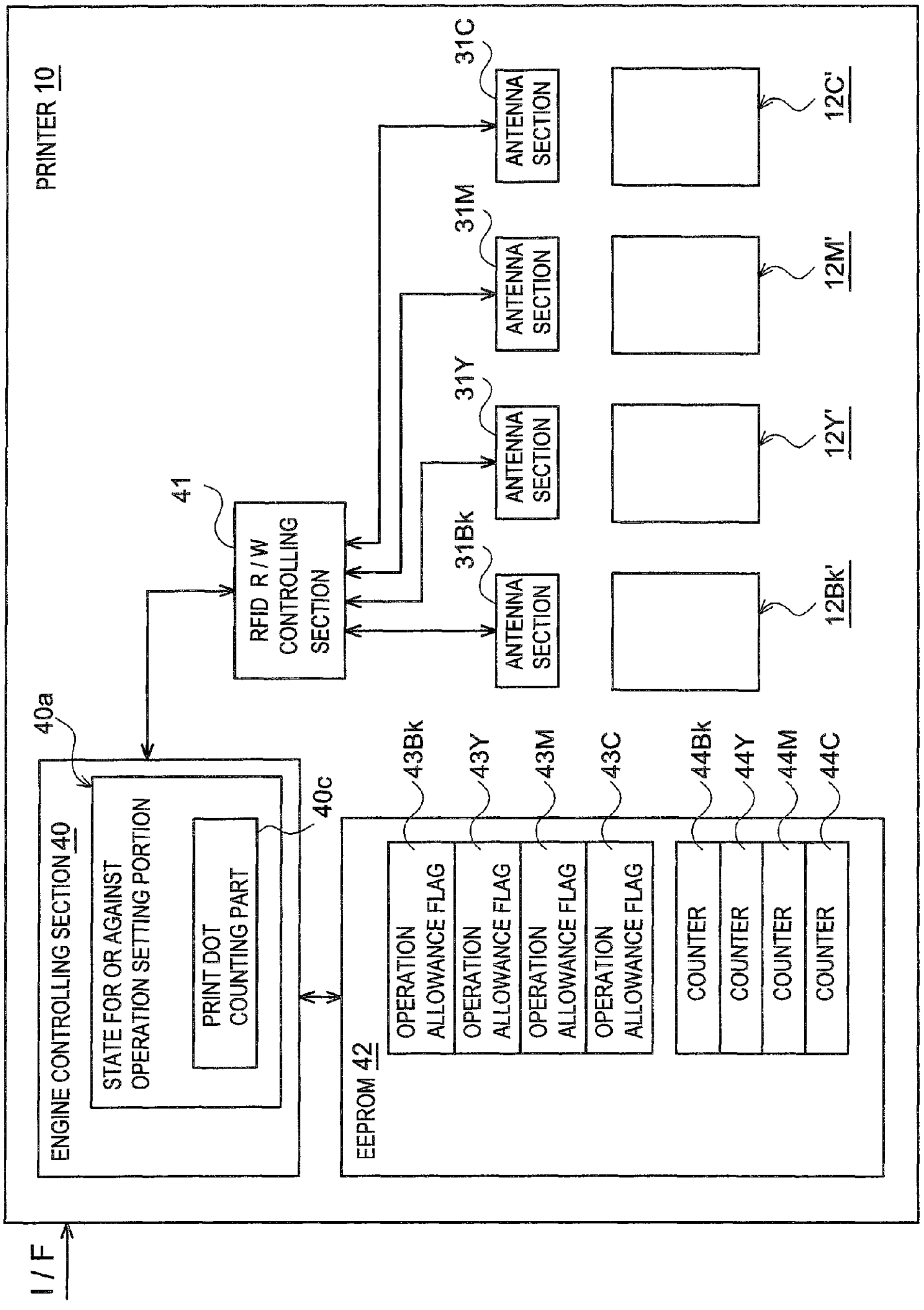
FIG. 17B is a control block showing a shipment state loading toner cartridges 12Bk', 12Y', 12M' and 12C' not holding RFID in embodiment 3 of the present invention.

FIG. 17A is a control block diagram of a printer in embodiment 3 of the present invention; and FIG. 17B is a control block showing a shipment state loading toner cartridges 12Bk', 12Y', 12M' and 12C' not holding RFID in embodiment 3 of the present invention.

As shown by the drawings, in the state for or against operation setting portion 40*a*, a print dot counting part 40*c* is provided as an image formation amount calculating process means. In the EEPROM 42, counters 44Bk, 44Y, 44M and 44C are provided as image formation amount storing areas.

Next, it will be explained regarding operation of the printer 10 with the above-stated structure.

In the embodiment, with a print is executed, the print dot counting part 40*c* calculates print dot numbers and switches an allowance of print.

Figure 18:
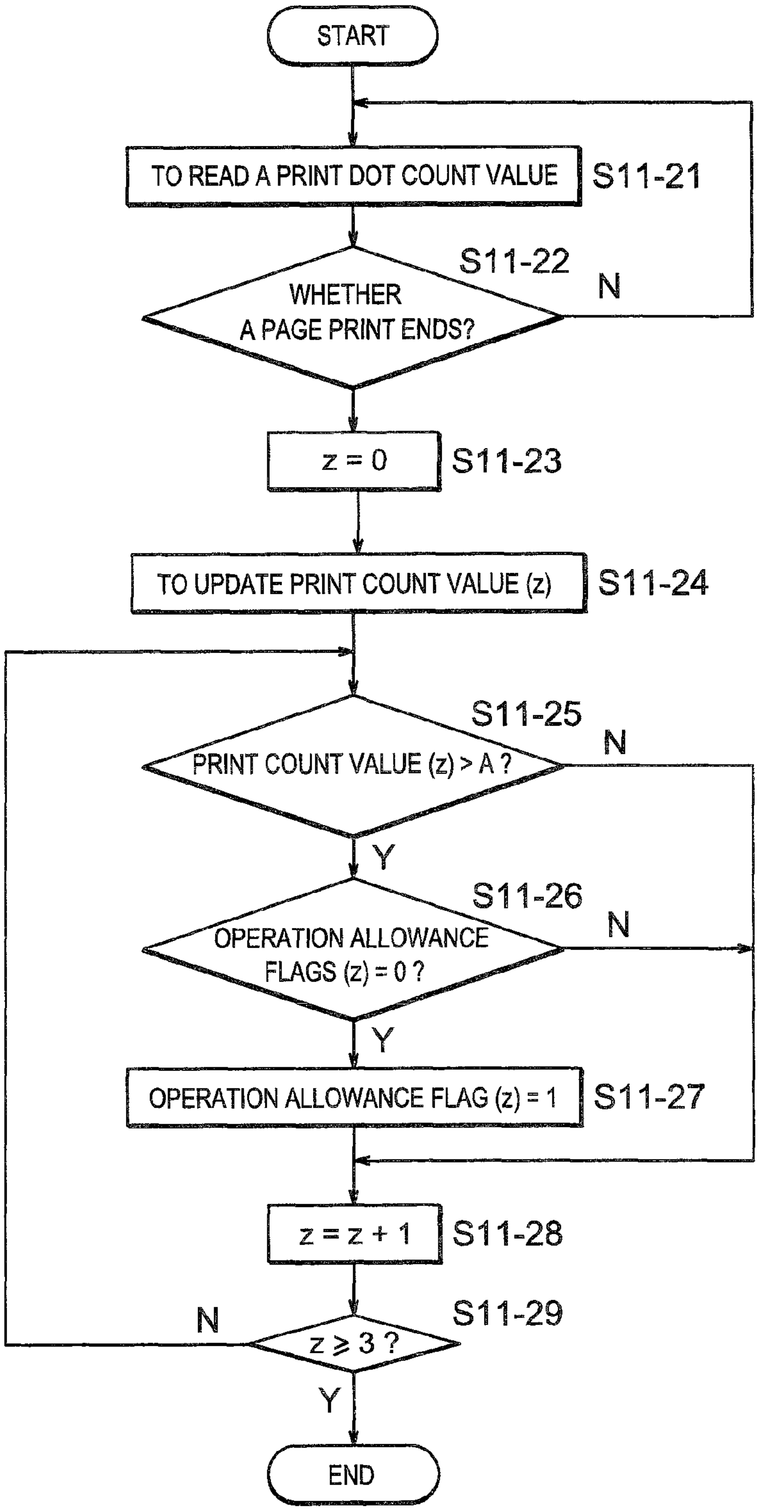
FIG. 18 is a diagram showing a subroutine of a state for or against operation setting process in embodiment 3 of the present invention.

FIG. 18 is a diagram showing a subroutine of a state for or against operation setting process in embodiment 3 of the present invention.

First, when page print is started, the print dot counting part 40*c* performs an image formation amount calculating process. The print dot counting part 40*c* starts to calculate print dot numbers and judges whether the page print of one page of paper has ended or not. When the page print of one page of paper ends, in the counters 44Bk, 44Y, 44M and 44C, the print dot numbers newly calculated are added to print count values (z) which are already counted and stored so that the print count values (z) are updated.

Then, an image formation amount judging process part of the state for or against operation setting portion 40*a* performs an image formation amount judging process. The image formation amount judging process part judges whether the print count value (z) is above an appointed value A or not. The appointed value A is set to be above a print dot number which can make print become possible according to toner amount fill in the respective toner cartridges 12Bk', 12Y', 12M' and 12C' mounted at the shipment stage of the printer 10. In the embodiment, in the respective toner cartridges 12Bk', 12Y', 12M' and 12C' mounted at the shipment stage of the printer 10, in the case to print paper of A4 size in a print duty of 5 [%], toner with a toner amount capable of printing paper passing area sheets is filled. Then, in the case to print in a resolution of 1200 [DPI], when printing paper of A4 size in a print duty of 5 [%], a print dot number is 6489038 dots. Here, the appointed value A is set into a value Ad above 2000 sheets× 6489038 dots. In view of an error of use amount of toner, the appointed value A is set into 1.5 times of the value Ad. Therefore, the appointed value A is 19,467,112,650.

Moreover, in the embodiment, the print duty, for example, is image pattern area/print effective area of one sheet. Here, the image pattern area is an area to which print toner is actually adhering in a sheet of paper; the print effective area is an area capable of effectively performing a print in the case to use paper of A4 size (210×297 [mm]) and to respectively space margin of 5 [mm] on left and right sides and space margin of 5 [mm] on upside and underside, that is, it is: $(210-5-5)\times(297-5-5)\ [\mathrm{mm}]^2=200\times287\ [\mathrm{mm}]^2$. That is, the print effective area is decided to correspond to a predetermined size of paper.

Then, in the case that the print count value (z) is above the appointed value A, the state for or against operation judging process part of the state for or against operation setting portion 40*a* judges whether the operation allowance flag (z) is "0" or not. If the operation allowance flag (z) is "0", the operation allowance index setting process part of the state for or against operation setting portion 40*a* sets the operation allowance flag (z) into "1".

In the case, after the print count value (z) becomes above the appointed value A, when the toner cartridges 12Bk', 12Y', 12M' and 12C' without the RFID tags 30Bk, 30Y, 30M and 30C are mounted, print is not allowed.

Thus, in the embodiment, after initialization process is performed, though print is allowed for a predetermined period, because the print is not allowed when the print count value (z) becomes above the appointed value A, so even if there is a special use state that operator uses imitational parts or similar parts of the toner cartridges 12Bk, 12Y, 12M and 12C from the beginning after the shipment of the printer 10, or the operator uses imitational parts or similar parts of the toner cartridges 12Bk, 12Y, 12M and 12C to exchange the toner cartridges 12Bk, 12Y, 12M and 12C on the way of using, after performed print of predetermined amount, it is possible to shift to a mode not to allow print. Therefore, it is possible to further certainly perform a management of the toner cartridges 12Bk, 12Y, 12M and 12C.

Next, it will be explained regarding flowchart.

Step S11-21: To read a print dot count value.

Step S11-22: To judge whether a page print ends or not. If the page print ended, step S11-23 is carried out; if the page print ended, the flowchart process returns to step S11-21.

Step S11-23: To set the control variable z into "0".

Step S11-24: To update a print count value (z).

Step S11-25: To judge whether the print count value (z) is above an appointed value A. If the print count value (z) is above the appointed value A, step S11-26 is carried out; if the print count value (z) is less than the appointed value A, step S11-28 is carried out.

Step S11-26: To judge whether an operation allowance flags (z) is "0" or not. If the operation allowance flag (z) is "0", step S11-27 is carried out; if the operation allowance flag (z) is not "0", step S11-28 is carried out.

Step S11-27: To set the operation allowance flag (z) into "1".

Step S11-28: To increase the control variable z.

Step S11-29: To judge whether the control variable z is or above "3" or not. If the control variable z is or above "3", the flowchart process is ended; if the control variable z is smaller than "3", the flowchart process returns to step S11-24.

<Embodiment 4>

The following is to explain an embodiment 4 of the present invention. Moreover, regarding the same composition as the embodiments 1, 2 and 3, it will be assigned the same symbol and the corresponding explanation will be omitted. Further, regarding the effect of present invention obtained by the same compositions, it will be applied to the embodiment 4.

Figure 19A:
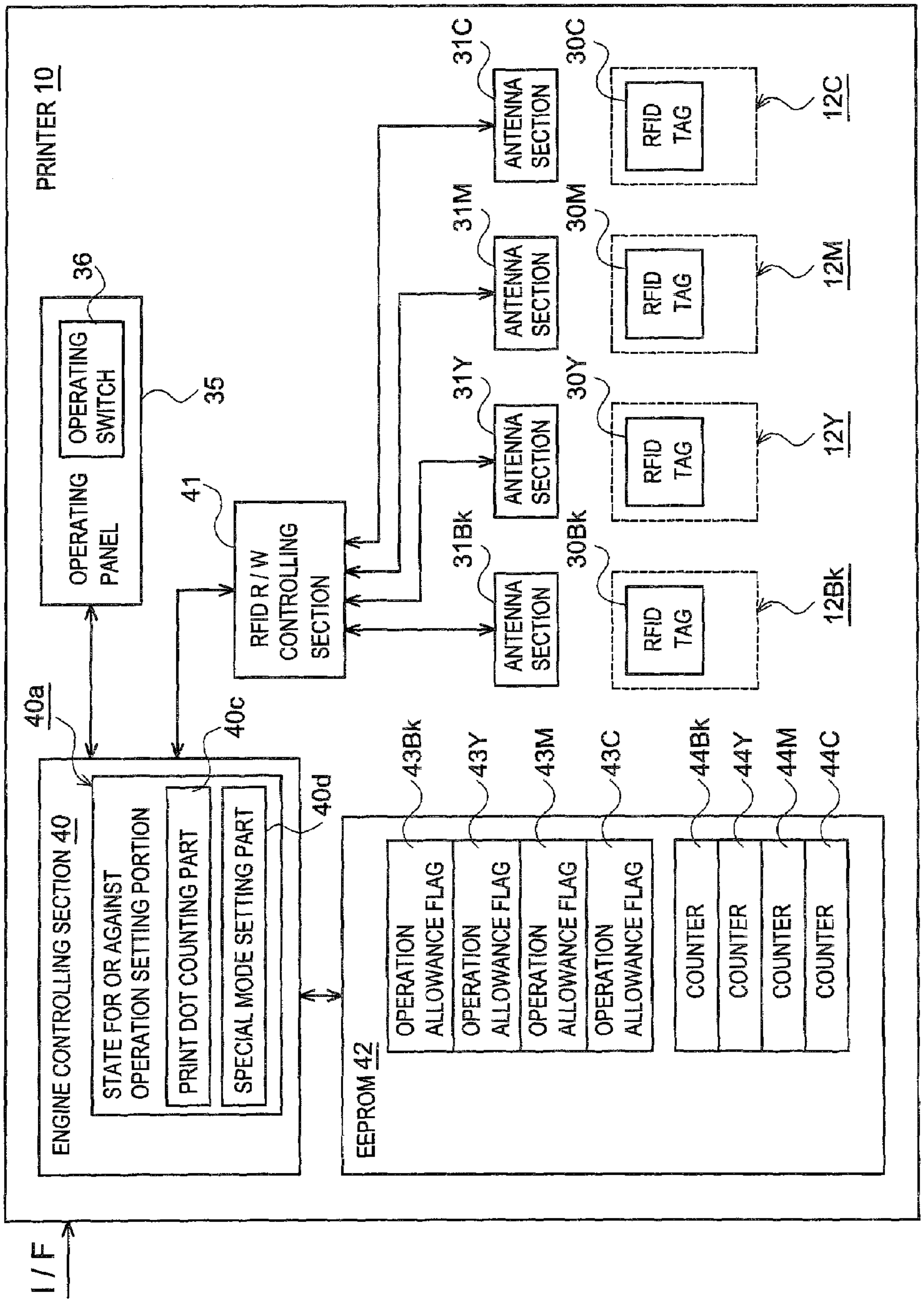
FIG. 19A is a control block diagram of a printer in embodiment 4 of the present invention.
Figure 19B:
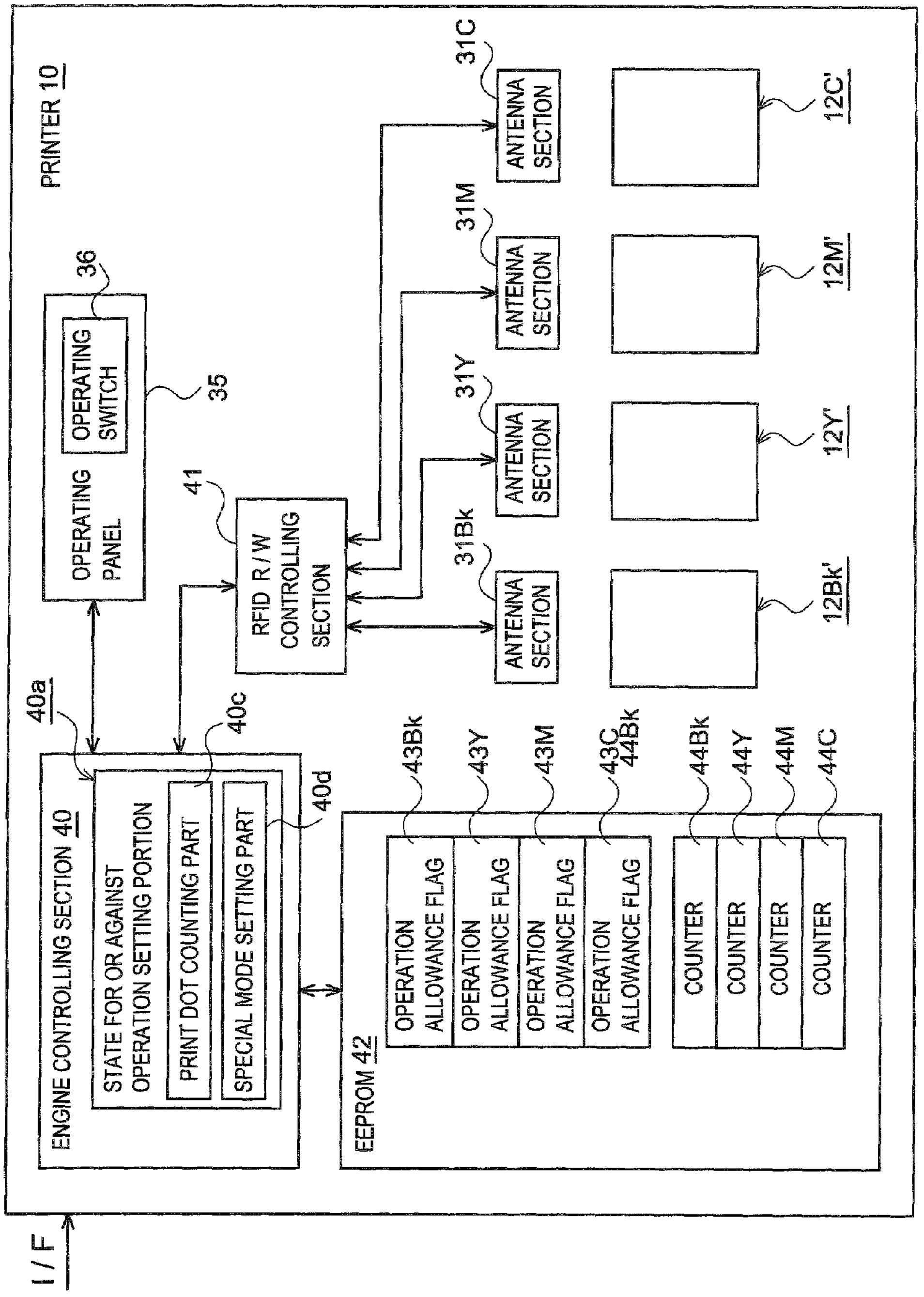
FIG. 19B is a control block showing a shipment state loading toner cartridges 12Bk', 12Y', 12M' and 12C' not holding RFID in embodiment 4 of the present invention.
Figure 20:
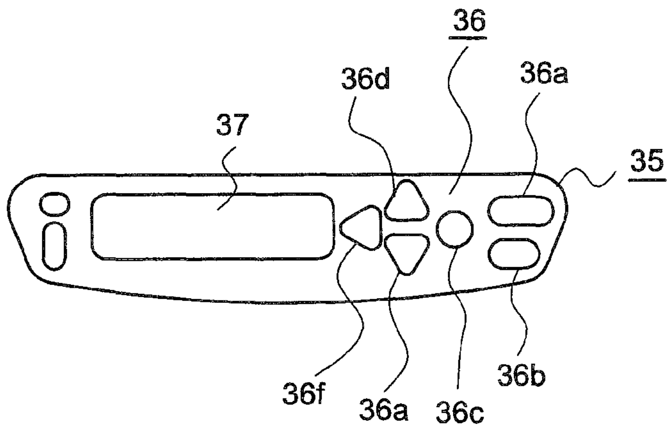
FIG. 20 is a diagram showing an operating panel in embodiment 4 of the present invention.

FIG. 19A is a control block diagram of a printer in embodiment 4 of the present invention; FIG. 19B is a control block showing a shipment state loading toner cartridges 12Bk', 12Y', 12M' and 12C' not holding RFID in embodiment 4 of the present invention; and FIG. 20 is a diagram showing an operating panel in embodiment 4 of the present invention.

As shown by the drawings, an operating panel 35 is connected with the engine controlling section 40, on the operating panel 35, an operating switch 36 made up of plural switches 36a~36e and a liquid crystal displayer 37 are provided. Further, in the state for or against operation setting portion 40a, the print dot counting part 40c serving as a print dot counting process means and a special mode setting part 40d serving as a special mode setting process means are provided.

Next, it will be explained regarding the printer 10 with the above-stated structure.

Figure 21:
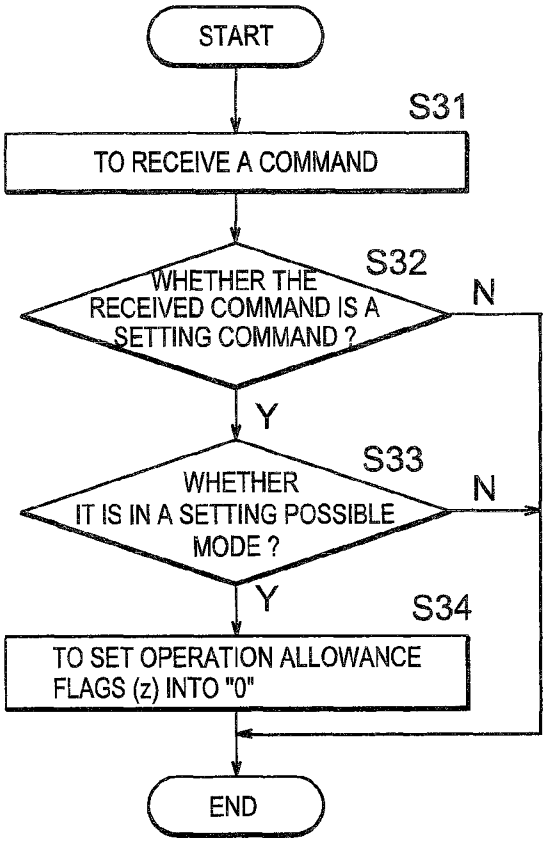
FIG. 21 is a flowchart showing operation of a state for or against operation setting portion in embodiment 4 of the present invention.

FIG. 21 is a flowchart showing operation of a state for or against operation setting portion in embodiment 4 of the present invention.

First, when the printer 10 received a command from a host computer, a command judging process part of the state for or against operation setting portion 40a performs a command judging process. The command judging process part judges whether the received command is a setting command of the operation allowance flags (z). Then, in the case that the received command is the setting command of the operation allowance flags (z), the special mode setting part 40d performs a special mode setting process. The special mode setting part 40d judges whether the printer 10 is set in a special mode capable of setting the operation allowance flag (z), that is, in a setting possible mode or not. In the case that the printer 10 is set in the setting possible mode, the above-stated operation allowance index setting process part performs an operation allowance index setting process to set the operation allowance flags (z) into "0".

Next, it will be explained regarding flowchart.

Step S31: To receive a command.

Step S32: To judge whether the received command is a setting command of the operation allowance flags (z). If it is, step S33 is carried out; and if it is not, the flowchart process is ended.

Step S33: To judge whether it is in a setting possible mode or not. If it is, step S34 is carried out; and if it is not, the flowchart process is ended.

Step S34: To set the operation allowance flags (z) into "0", and end the flowchart process.

Continuously, it will be explained regarding operation of the state for or against operation setting portion 40a in the case to set the setting possible mode.

Figure 22:
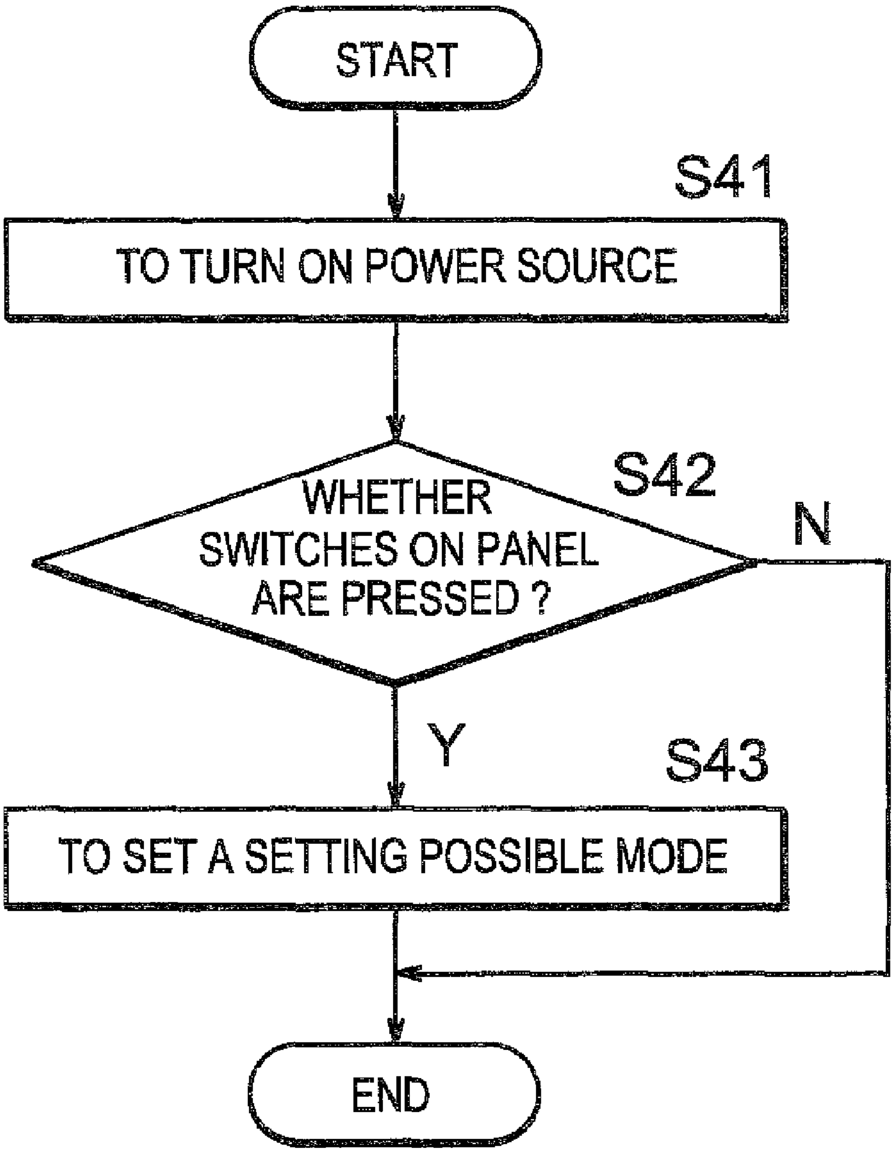
FIG. 22 is a flowchart showing operation of a special mode setting process section in embodiment 4 of the present invention.

FIG. 22 is a flowchart showing operation of a special mode setting process section in embodiment 4 of the present invention.

First, when operator turns on the power source of the printer 10, the special mode setting part 40d performs a special mode setting process. The special mode setting part 40d judges a pressing state of the operating switch 36 provided on the operating panel 35. In the case that the switches 36a~36e of the operating switch 36 are pressed simultaneously, the special mode setting part 40d sets the setting possible mode; in the case that the switches 36a~36e of the operating switch 36 are not pressed simultaneously, end the process.

Thus, when the power source is turned on in the state that the switches 36a~36e of the operating switch 36 are pressed simultaneously, the setting possible mode is set. Then, only in the case that a setting command of the operation allowance flag (z) is received in the state that the setting possible mode is set, the operation allowance flag (z) is set into "0".

Therefore, even if operator has known the setting command, if he/she does not know the operations above-stated, it is impossible to set the operation allowance flag (z) into "0". As a result, such possibility becomes extremely small that operator sets the operation allowance flag (z) into "0" due to a mistake. So it is possible to surely manage the toner cartridges 12Bk, 12Y, 12M and 12C.

Next, it will be explained regarding flowchart.

Step S41: To turn on power source.

Step S42: To judge whether the switches 36a~36e on the operating panel 35 are pressed. In the case that the switches 36a~36e on the operating panel 35 are pressed, step S43 is carried out; and if they are not pressed, the flowchart process is ended.

Step S43: To set setting possible mode and end the process.

<Embodiment 5>

The following is to explain an embodiment 5 of the present invention. Moreover, regarding the same composition as the embodiments 1, 2, 3 and 4, it will be assigned the same symbol and the corresponding explanation will be omitted. Further, regarding the effect of present invention obtained by the same compositions, it will be applied to the embodiment 5.

Figure 23A:
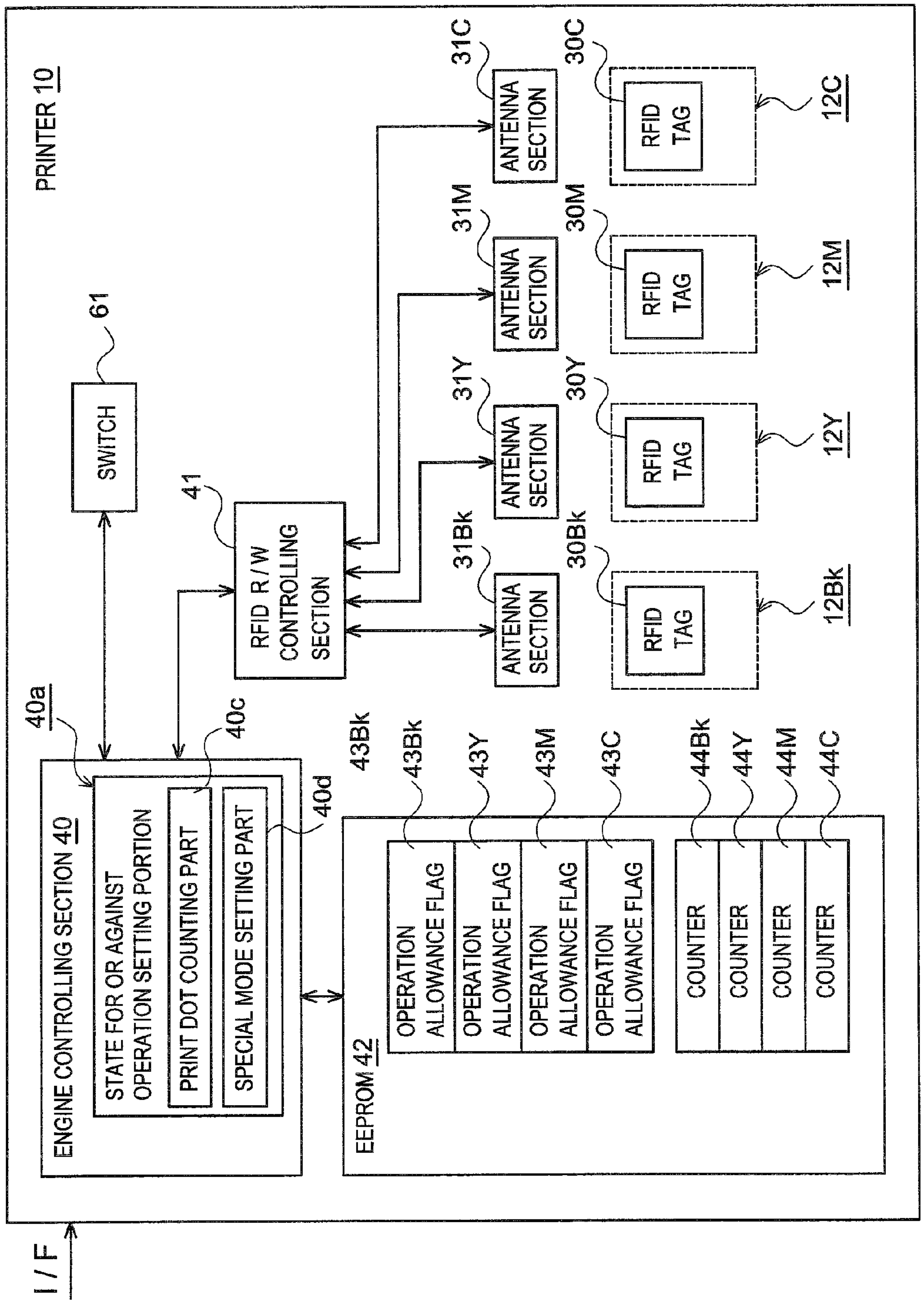
FIG. 23A is a control block diagram of a printer in embodiment 5 of the present invention.
Figure 23B:
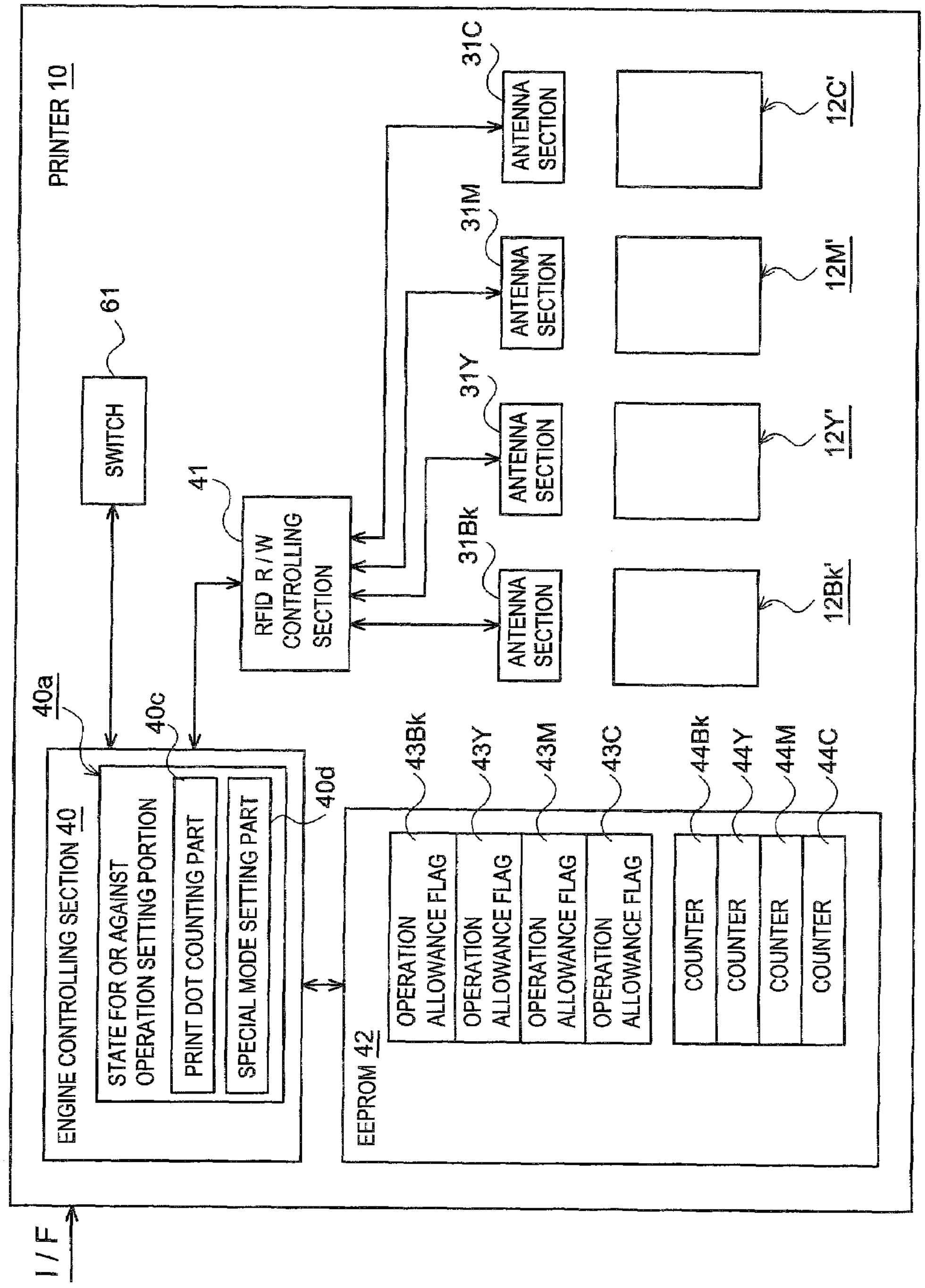
FIG. 23B is a control block showing a shipment state loading toner cartridges 12Bk', 12Y', 12M' and 12C' not holding RFID in embodiment 5 of the present invention.
Figure 24:
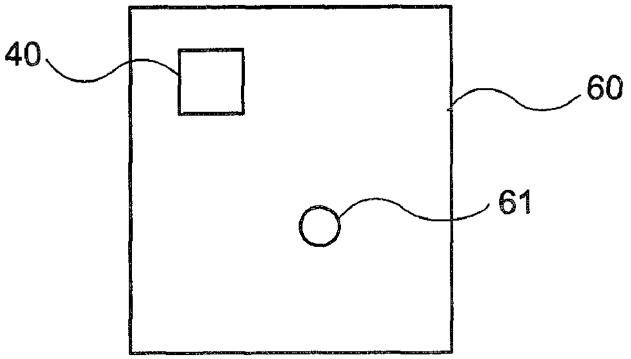
FIG. 24 is a summary diagram showing a control substrate in embodiment 5 of the present invention.

FIG. 23A is a control block diagram of a printer in embodiment 5 of the present invention; FIG. 23B is a control block showing a shipment state loading toner cartridges 12Bk', 12Y', 12M' and 12C' not holding RFID in embodiment 5 of the present invention; and FIG. 24 is a summary diagram showing a control substrate in embodiment 5 of the present invention.

As shown by the drawings, on a control substrate 60, an engine controlling section 40 and a switch 61 are furnished. The switch 61 is connected with an input port of the engine controlling section 40.

Next, it will be explained regarding the printer 10 with the above-stated structure.

Figure 25:
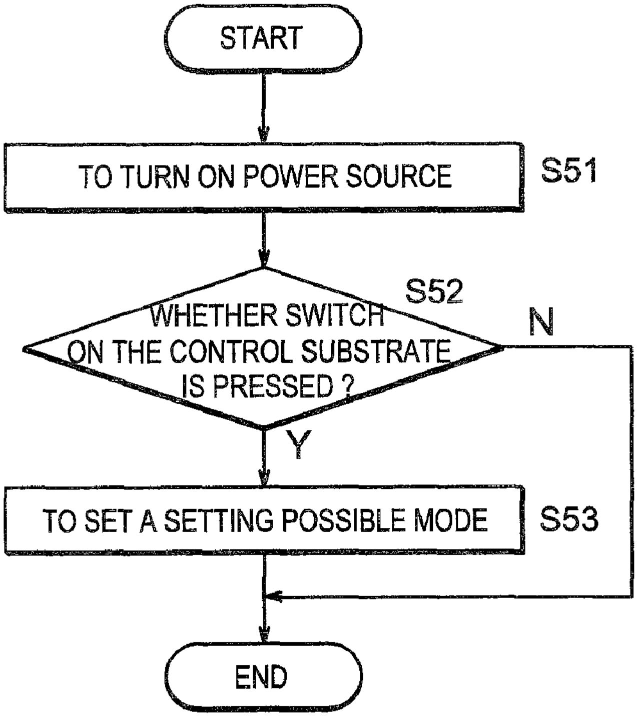
FIG. 25 is a flowchart showing operation of a special mode setting process section in embodiment 5 of the present invention.

FIG. 25 is a flowchart showing operation of a special mode setting process section in embodiment 5 of the present invention.

First, when operator turns on the power source of the printer 10, the special mode setting part 40d judges a pressing state of the switch 61 provided on the control substrate 60. In the case that the switch 61 is pressed, the special mode setting part 40d sets a setting possible mode; in the case that the switch 61 is not pressed, end the process.

Thus, in the state that the switch 61 provided on the control substrate 60 is pressed, only in the case that the power source is turned on, that is, a special operation is caused which is not be executed by operator in general, the setting possible mode is set. Then, only in the case that a setting command of the operation allowance flag (z) is received in the state that the setting possible mode is set, the operation allowance flag (z) is set into "0".

Therefore, even if operator has known the setting command, if he/she does not know the operations above-stated, it is impossible to set the operation allowance flag (z) into "0". As a result, such possibility becomes extremely small that operator sets the operation allowance flag (z) into "0" due to a mistake. So it is possible to surely manage the toner cartridges 12Bk, 12Y, 12M and 12C.

Next, it will be explained regarding flowchart.

Step S51: To turn on power source.

Step S52: To judge whether the switch 61 on the control substrate 60 is pressed. In the case that the switch 61 on the control substrate 60 is pressed, step S53 is carried out; and if it is not pressed, the flowchart process is ended.

Step S53: To set a setting possible mode and end the process.

<Embodiment 6>

The following is to explain an embodiment 6 of the present invention. Moreover, regarding the same composition as the embodiments 1, 2, 3, 4 and 5, it will be assigned the same symbol and the corresponding explanation will be omitted. Further, regarding the effect of present invention obtained by the same compositions, it will be applied to the embodiment 6.

Figure 26A:
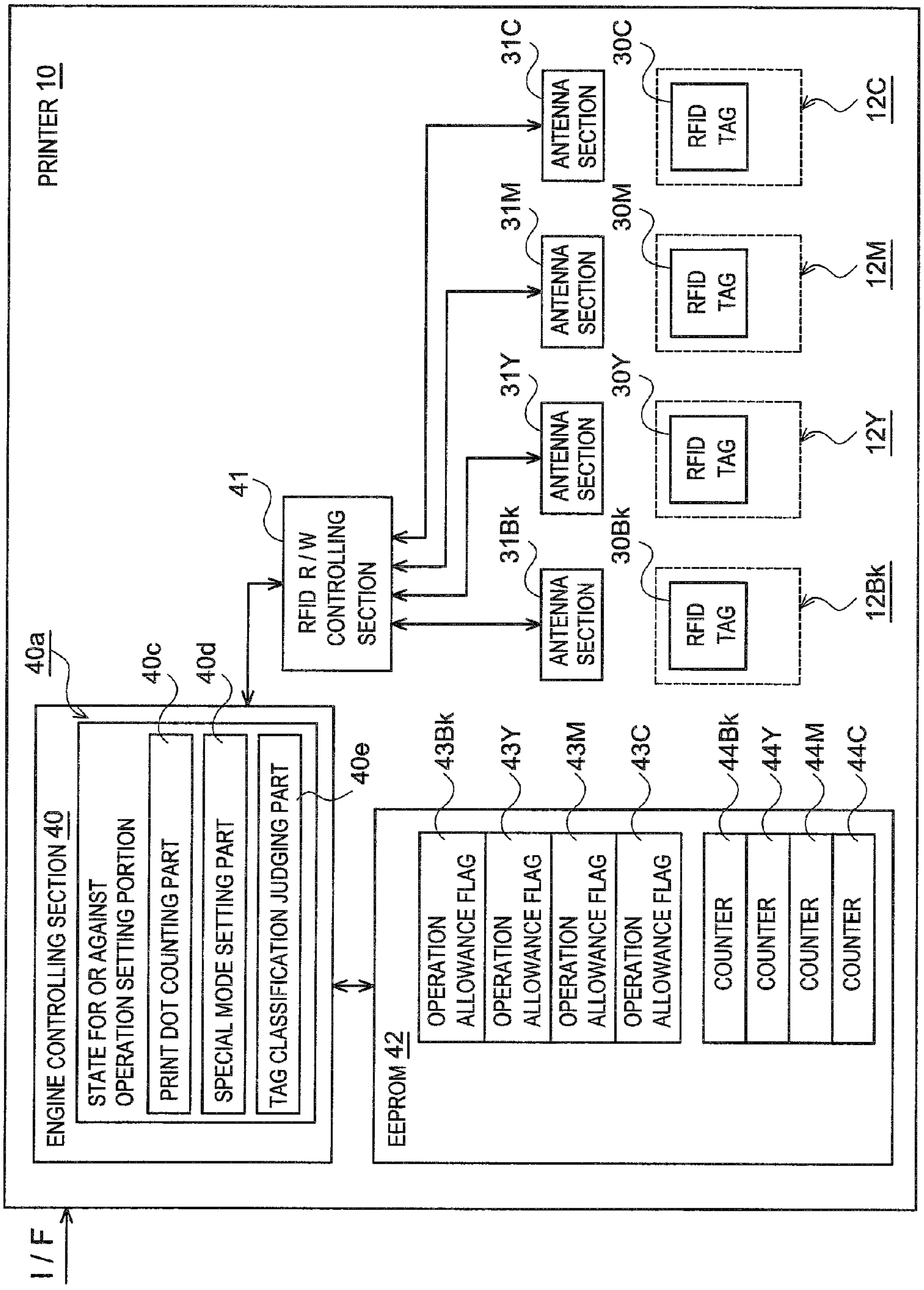
FIG. 26A is a control block diagram of a printer in embodiment 6 of the present invention.
Figure 26B:
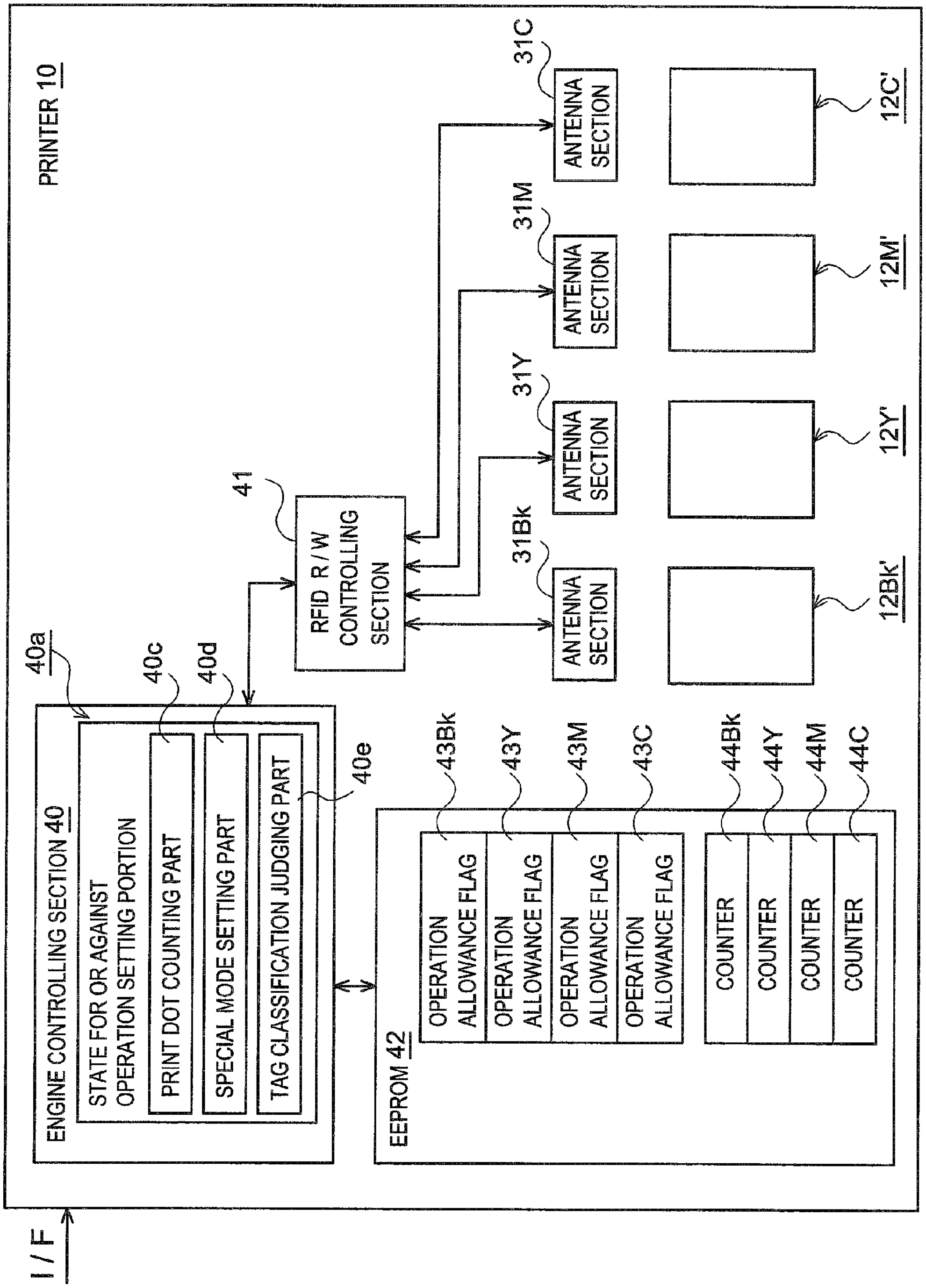
FIG. 26B is a control block showing a shipment state loading toner cartridges 12Bk', 12Y', 12M' and 12C' not holding RFID in embodiment 6 of the present invention.
Figure 27:
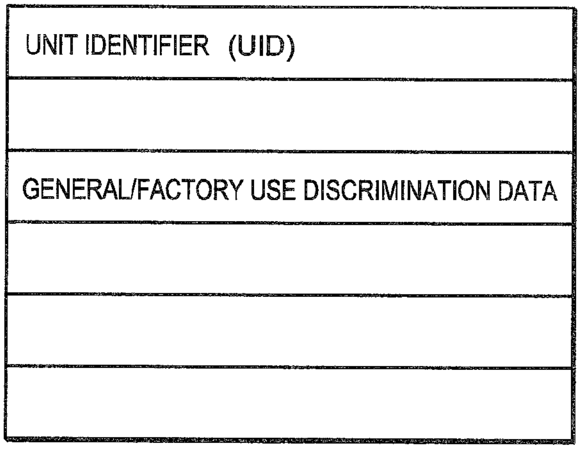
FIG. 27 is a diagram showing data structure of RFID tag in embodiment 6 of the present invention.

FIG. 26A is a control block diagram of a printer in embodiment 6 of the present invention; FIG. 26B is a control block showing a shipment state loading toner cartridges 12Bk', 12Y', 12M' and 12C' not holding RFID in embodiment 6 of the present invention; and FIG. 27 is a diagram showing data structure of RFID tag in embodiment 6 of the present invention.

As shown by FIGS. 26A and 26B, in the state for or against operation setting portion 40*a*, a tag classification judging part 40*e* serving as a tag classification judging process means is provided. Then, as shown by FIG. 27, a part of the respective RFID tags 30Bk, 30Y, 30M and 30C is a general/factory use discrimination data area 65. That is, the data of the respective RFID tags 30Bk, 30Y, 30M and 30C, except containing an unit identifier (UID) for identifying the toner cartridges 12Bk, 12Y, 12M and 12C, further contains a general/factory use discrimination data stored in the general/factory use discrimination data area 65. Moreover, in respective RFID tags 30Bk, 30Y, 30M and 30C for general use, data of 0x00h is stored in the general/factory use discrimination data area 65, however, in the embodiment, in respective RFID tags 30Bk, 30Y, 30M and 30C for factory use, data of 0xAAh is stored in the general/factory use discrimination data area 65.

Next, it will be explained regarding the printer 10 with the above-stated structure.

Figure 28:
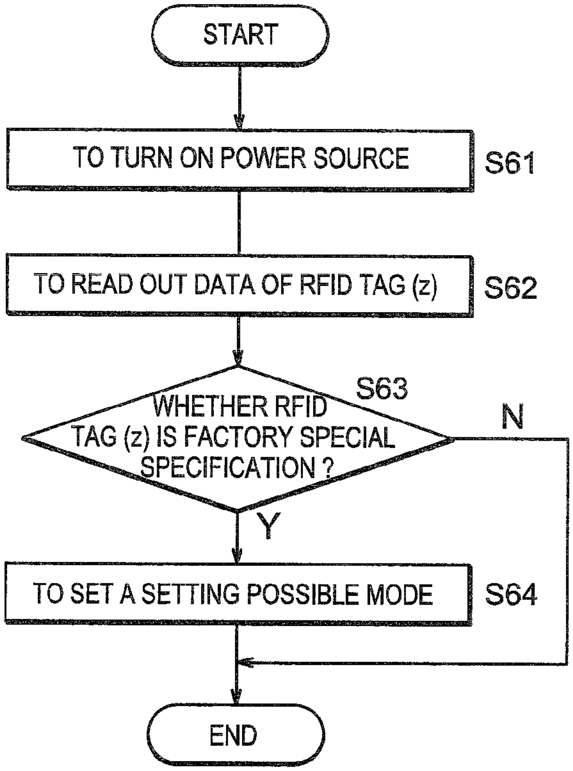
FIG. 28 is a flowchart showing operation of a special mode setting process section in embodiment 6 of the present invention.

FIG. 28 is a flowchart showing operation of a special mode setting process section in embodiment 6 of the present invention.

First, when operator turns on the power source of the printer 10, a RFID tag reading process part serving as an identification information obtaining process means of the state for or against operation setting portion 40*a* reads respective data of the RFID tag (z). The tag classification judging part 40*e* performs a tag classification judging process to execute a discrimination of data of the general/factory use discrimination data area 65. In the case that the data is 0xAAh, the tag classification judging part 40*e* judges that the RFID tag (z) is a special RFID tag (z), and the special mode setting part 40*d* sets a setting possible mode. In the case that the data is not 0xAAh, the process is ended.

If to simply explain the above-stated process, that is, when turning on the power source, in the case that the data of the general/factory use discrimination data area 65 of the RFID tag (z) is 0xAAh, a special mode is set. Then, only in the case that a setting command is received in the state that the special mode is set, the operation allowance flag (z) is set to allowance.

Thus, in the embodiment, it is possible to set the operation allowance flag (z) into "0" only in the case that the RFID tag (z) in which special data is written is detected.

Therefore, even if operator has known the setting command, if he/she does not know the operations above-stated, it is impossible to set the operation allowance flag (z) into "0". As a result, such possibility becomes extremely small that operator sets the operation allowance flag (z) into "0" due to a mistake. So it is possible to surely manage the toner cartridges 12Bk, 12Y, 12M and 12C.

Next, it will be explained regarding flowchart.

Step S61: To turn on power source.

Step S62: To read data of the RFID tag (z).

Step S63: To judge whether the RFID tag (z) is factory special specification or not. If it is, step S64 is carried out; and if it is not, the flowchart process is ended.

Step S64: To set a setting possible mode and end the process.

Moreover, in the respective embodiments, the printer 10 is explained, but the present invention is not limited to the printer, it also can be applied to other apparatus such as facsimile apparatus, copying apparatus, multiple apparatus or the like to replace the printer.

Further, in the respective embodiments, RFID tags (z) serving as identification information storing portions are provided in the toner cartridges 12Bk, 12Y, 12M and 12C. However, it is also possible to provide non-volatility memory such as EEPROM, or provide ROM and the like except the RFID tag (z).

Furthermore, the present invention also can be applied to such case to exchange ink tank or ink cartridge to accommodate ink, or other case to use consumables except the toner cartridges 12Bk, 12Y, 12M and 12C as exchange parts.

The present invention is not limited to the foregoing embodiments but many modifications and variations are possible within the spirit and scope of the appended claims of the invention.

What is claimed is:

1. An image forming apparatus in which an attachable and removable exchange part is furnished, comprising:

- an identification information obtaining process section capable of obtaining identification information of the exchange part from the exchange part; and
- an operation allowing process section to perform
  - non-limited image formation, before and after a predetermined period has been reached, in a normal operation mode using a plurality of print parameters, that includes print speed, if the identification information obtaining process section can obtain the identification information, and
  - non-limited image formation in the normal operation mode using the plurality of print parameters if the identification information obtaining process section cannot obtain the identification information, an operator does not provide information relating to the exchange part, and the predetermined period has not been reached, and limited image formation if the identification information obtaining process section cannot obtain the identification information, the operator does not provide information relating to the exchange part, and the predetermined period has been reached.

2. The image forming apparatus according to claim 1, wherein the predetermined period is reached when non-limited image formation occurs so as to meet a predetermined condition after an initialization process of the image forming apparatus is performed.

3. The image forming apparatus according to claim 2, wherein the exchange part has an identification information storing portion to store identification information of the exchange part.

4. The image forming apparatus according to claim 3, wherein the identification information storing portion of the exchange part is a Radio Frequency Identification tag.

5. The image forming apparatus according to claim 1, wherein the exchange part is a developer accommodating section to accommodate developer.

6. The image forming apparatus according to claim 5, wherein the developer accommodating section is an ink tank to accommodate ink.

7. The image forming apparatus according to claim 5, wherein the developer accommodating section is an ink cartridge to accommodate ink.

8. The image forming apparatus according to claim 5, wherein the developer accommodating section is a toner cartridge to accommodate toner.

9. The image forming apparatus according to claim 1, wherein the operation allowing process section has a counting portion to count a predetermined operation after an initialization process of the image forming apparatus is performed, and the predetermined period is reached when a count value of the counting portion meets a count predetermined condition.

10. The image forming apparatus according to claim 9, wherein the operation allowing process section, when the count value of the counting portion meets the count predetermined condition, drops a speed of the image formation.

11. The image forming apparatus according to claim 9, wherein the counting portion has a dot counting part to accumulate a dot number of one or more printed images, and the predetermined period is reached when the count value of the dot counting part meets the count predetermined condition.

12. The image forming apparatus according to claim 1, further comprising:

an exchange judging section to judge whether the exchange part is exchanged, wherein the predetermined period is determined to be reached based in part upon when the exchange judging section judges that the exchange part is exchanged.

13. The image forming apparatus according to claim 12, wherein the exchange judging section, when the obtainment of the identification information of the exchange part is possible, stores exchange information indicating that an exchange of the exchange part is executed to a storing section, and the operation allowing process section reads out the exchange information from the storing section and judges that the exchange part has been exchanged so as to allow the predetermined period to be reached and performs limited image formation when the identification information cannot be obtained and the predetermined period is reached.

14. The image forming apparatus according to claim 1, further comprising:

a remainder amount judging section to judge whether a remainder amount of consumables supplied by the exchange part becomes a remainder predetermined value and stores a record indicating whether the remainder amount is less than the remainder predetermined value, when the remainder amount judging section judges that the remainder amount of the exchange part is less than the remainder predetermined value, and exchange information indicating that an exchange of the exchange part is executed to a storing section the predetermined period is reached.

15. The image forming apparatus according to claim 1, wherein the predetermined period is reached when the exchange part is determined to have sufficiently low toner.

16. The image forming apparatus according to claim 1, wherein the identification information cannot be obtained and the operator does not supply information relating to the exchange part such that a manufacturer and a product name of the exchange part are unidentifiable.

17. A system comprising the elements of:

an exchange part that is either a first type of exchange part that includes an electronic identification device that includes identification information or a second type of exchange part that does not include an electronic identification device that includes identification information; and an image forming apparatus adapted to obtain the identification information from the first type of exchange part, the image forming apparatus including an operation allowing process section that determines if the exchange part is the first type of exchange part or the second type of exchange part based upon whether identification information is obtained from the exchange part, the operation allowing process section performing non-limited image formation, before and after a predetermined period has been reached, in a normal operation mode using a plurality of print parameters that includes print speed if the exchange part is the first type, and non-limited image formation in the normal operation mode using the plurality of print parameters if the exchange part is the second type until the predetermined period has been reached and then limited image formation after the predetermined period has been reached.

18. The system of claim 17, wherein the exchange part is the first type.

19. The system of claim 17, wherein the exchange part is the second type.

20. The system of claim 17, wherein the predetermined period is reached when the exchange part is determined to have sufficiently low toner.

21. The system of claim 17, wherein the predetermined period is reached if a print count value of the image forming apparatus is above an appointed value.

22. An image forming apparatus comprising:

an exchange part for printing;

an identification information obtaining process section that determines whether the exchange part includes an electronic identification device that includes identification information; and an operation allowing process section, if the identification information obtaining process section determines that the exchange part includes the electronic identification device that includes identification information, the operation allowing process section performs non-limited image formation in a normal operation mode using a plurality of print parameters, that includes print speed, before and after a predetermined period has been reached, and if the identification information obtaining process section determines that the exchange part does not include the electronic identification device that includes identification information, the operation allowing process section performs non-limited image formation in the normal operation mode using the plurality of print parameters for the predetermined period and then limited image formation after the predetermined period has been reached.

23. The image forming apparatus according to claim 22, wherein the predetermined period is reached when a count value of a predetermined operation meets a count predetermined condition.

24. The image forming apparatus according to claim 22, wherein limited image formation includes dropping a speed of image formation.

25. The image forming apparatus according to claim 22, wherein a number of dots printed during formation of one or more printed images is stored, and the predetermined period is reached when the number of dots meets a count predetermined condition.

26. The image forming apparatus according to claim 22, wherein the predetermined period is reached when the exchange part is determined to have sufficiently low toner.

27. The image forming apparatus according to claim 22, wherein an operator does not supply information relating to the exchange part such that the identification information cannot be obtained and a manufacturer and a product name of the exchange part are unidentifiable.

28. The system according to claim 17, wherein the exchange part is the second type and a manufacturer and a product name of the exchange part are unidentifiable.

* * * * *